(12) United States Patent
Beissel et al.

(10) Patent No.: US 12,538,911 B2
(45) Date of Patent: Feb. 3, 2026

(54) SPLIT BOBBER AND SNAP-ON BEAD TERMINAL TACKLE SYSTEM

(71) Applicant: Betts Tackle, Ltd., Fuquay-Varina, NC (US)

(72) Inventors: Mason Robert Beissel, Cannon Falls, MN (US); Curtis John Beissel, Cannon Falls, MN (US); Robert Michael Beissel, Cannon Falls, MN (US); Zachary Lee Howerton, Fuquay-Varina, NC (US)

(73) Assignee: Betts Tackle, Ltd., Fuquay-Varina, NC (US)

( * ) Notice: Subject to any disclaimer, the term of this patent is extended or adjusted under 35 U.S.C. 154(b) by 0 days.

(21) Appl. No.: 18/942,935

(22) Filed: Nov. 11, 2024

(65) Prior Publication Data

US 2025/0151708 A1     May 15, 2025

Related U.S. Application Data

(60) Provisional application No. 63/597,857, filed on Nov. 10, 2023.

(51) Int. Cl.
    *A01K 93/00*      (2006.01)
    *A01K 91/06*      (2006.01)

(52) U.S. Cl.
    CPC .............. *A01K 93/00* (2013.01); *A01K 91/06* (2013.01)

(58) Field of Classification Search
    CPC ........ A01K 93/00; A01K 91/06; A01K 85/00; A01K 85/18; A01K 95/00
    USPC ................ 43/43.1, 42.36, 42.28, 44.9, 44.91
    See application file for complete search history.

(56) References Cited

U.S. PATENT DOCUMENTS

| | | | | |
|---|---|---|---|---|
| 419,574 A | * | 1/1890 | Vasseur | A01K 93/00 43/44.92 |
| 676,724 A | * | 6/1901 | McCargar et al. | A01K 93/00 24/114.5 |
| 1,098,018 A | * | 5/1914 | Cook | F16B 7/22 166/241.2 |
| 2,601,736 A | * | 7/1952 | Fisher | A01K 93/00 43/43.11 |
| 2,611,211 A | * | 9/1952 | Stockton | A01K 93/00 403/345 |
| 2,958,153 A | * | 11/1960 | Yerman | A01K 95/00 43/43.14 |

(Continued)

*Primary Examiner* — Monica L Perry
*Assistant Examiner* — Maria E Graber
(74) *Attorney, Agent, or Firm* — FBT Gibbons LLP

(57) ABSTRACT

Systems and methods for a terminal tackle system with a bobber and bead. The bobber includes a grip portion with a grip housing and grip insert and a slip portion with a slip housing and slip insert. The grip insert includes a grip channel, an insert aperture, a tab, and a first groove. The slip insert includes a slip channel, an insert peg, an upper snap fit recess, and a first tongue. The insert peg includes a vertical quadrant channel and a horizontal quadrant channel that separate the insert peg into four quadrants. The bead includes a longitudinal channel, an upper notch, a lower notch, and an insertion channel. The upper notch and lower notch are wedge shaped and in communication with the longitudinal channel, with the outer end of each wider than its inner end. The insertion channel is positioned vertically between the upper notch and the lower notch.

13 Claims, 25 Drawing Sheets

(56) References Cited

U.S. PATENT DOCUMENTS

| | | | | |
|---|---|---|---|---|
| 3,019,546 | A * | 2/1962 | Hansen | A01K 91/04 43/44.91 |
| 3,107,451 | A * | 10/1963 | Sitzler | A01K 93/00 43/44.87 |
| 3,173,222 | A * | 3/1965 | Hansen | A01K 93/00 16/225 |
| 3,785,080 | A * | 1/1974 | Wallace | A01K 97/06 43/54.1 |
| 3,967,407 | A * | 7/1976 | Halbasch | A01K 93/00 43/44.9 |
| 4,177,599 | A * | 12/1979 | Pettersen | A01K 91/08 43/43.12 |
| 4,616,441 | A * | 10/1986 | Dmytriw | A01K 93/00 43/44.91 |
| 4,635,392 | A | 1/1987 | Wirkus | |
| 4,696,125 | A | 9/1987 | Rayburn | |
| 4,771,565 | A * | 9/1988 | Shepherd | A01K 73/053 43/43.1 |
| 4,845,877 | A * | 7/1989 | Koetje | A01K 75/04 43/14 |
| 5,241,774 | A | 9/1993 | Rayburn | |
| 6,058,645 | A * | 5/2000 | Lummis | A01K 85/16 43/42.33 |
| 6,931,786 | B1 * | 8/2005 | Bennett | A01K 93/00 43/44.89 |
| 7,162,830 | B2 * | 1/2007 | Sims | A01K 95/02 43/44.87 |
| 7,481,020 | B1 * | 1/2009 | Ruzicka | A01K 93/00 43/44.87 |
| 8,341,871 | B2 * | 1/2013 | Kavanaugh | A01K 93/00 43/44.87 |
| 8,627,594 | B1 * | 1/2014 | Weron | A01K 85/16 43/42.32 |
| 9,265,240 | B2 * | 2/2016 | Kavanaugh | A01K 93/00 |
| 9,655,353 | B1 * | 5/2017 | Hudson | A01K 91/06 |
| 10,149,463 | B2 * | 12/2018 | Hudson | A01K 85/18 |
| 11,465,549 | B2 * | 10/2022 | Lopez | B60P 7/0838 |
| 12,137,678 | B2 * | 11/2024 | Douglas | A01K 93/00 |
| 2009/0293338 | A1 * | 12/2009 | Lu | A01K 95/02 43/43.1 |
| 2022/0312751 | A1 * | 10/2022 | Mcgill | A01K 91/06 |
| 2024/0334919 | A1 * | 10/2024 | Douglas | A01K 93/00 |

* cited by examiner

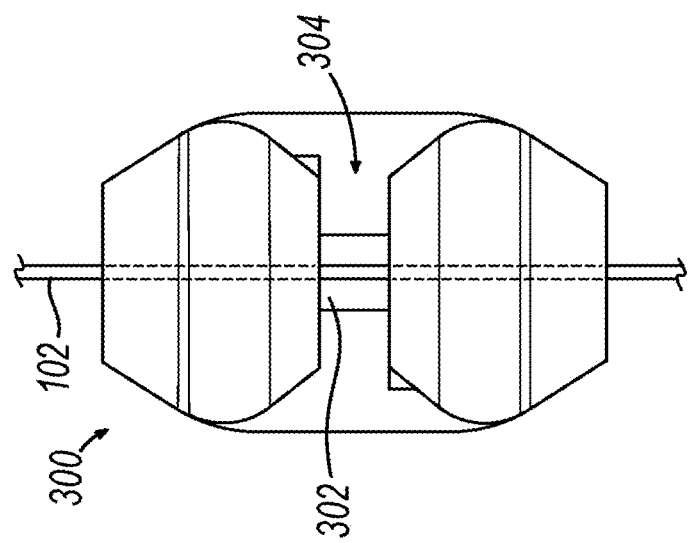
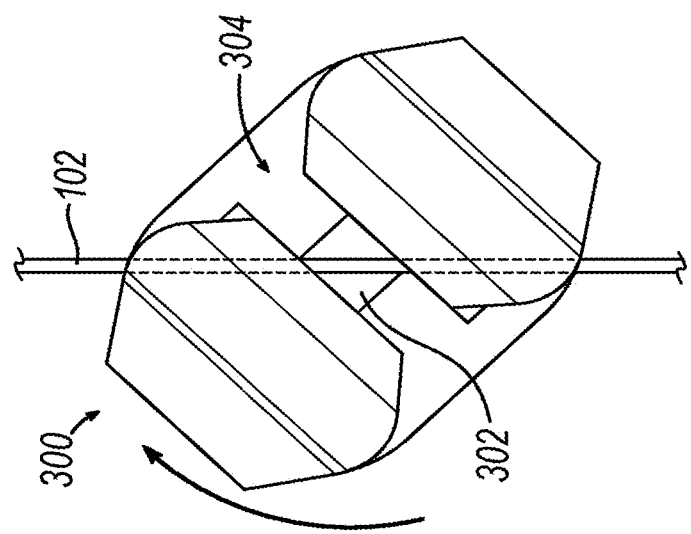
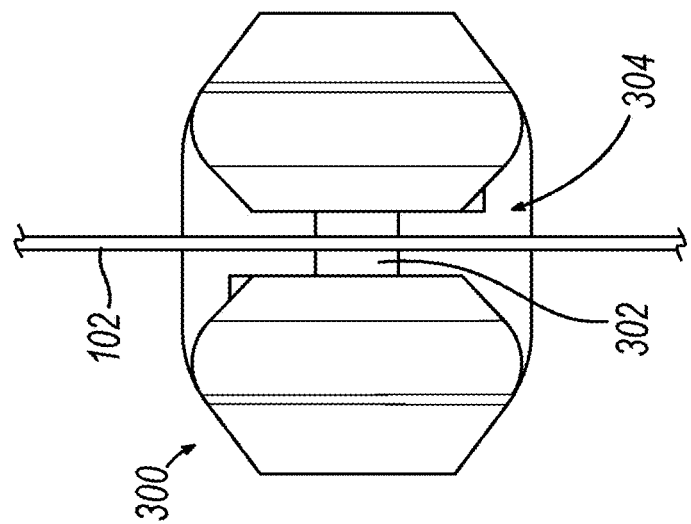

US 12,538,911 B2

SPLIT BOBBER AND SNAP-ON BEAD TERMINAL TACKLE SYSTEM

PRIORITY

This application claims priority to U.S. Provisional Pat. App. No. 63/597,857, entitled "Split Bobber and Snap-On Bead Terminal Tackle System," filed on Nov. 10, 2023, the disclosure of which is incorporated by reference herein.

BACKGROUND

Contemporary fishing utilizes a variety of equipment, collectively or individually referred to as fishing tackle. Fishing tackle located near the end of the fishing line that gets cast out with the bait can be commonly referred to as terminal tackle. The terminal tackle may comprise various components, including bobbers and beads included. Such components are configured in multiple ways on the fishing line, often threading the fishing line through the component before attaching a hook or tying a knot with the fishing line at a connection point of the component.

While a variety of terminal tackle components have been made and used, it is believed that no one prior to the inventors has made or used an invention as described herein.

BRIEF DESCRIPTION OF THE DRAWINGS

It is believed the present invention will be better understood from the following description of certain examples taken in conjunction with the accompanying drawings, in which like reference numerals identify the same elements and in which:

FIGS. 24A-24C depict front plan views of the snap-on bead of FIG. 13 during the process of attaching the snap-on bead to a fishing line.

Figure 1:
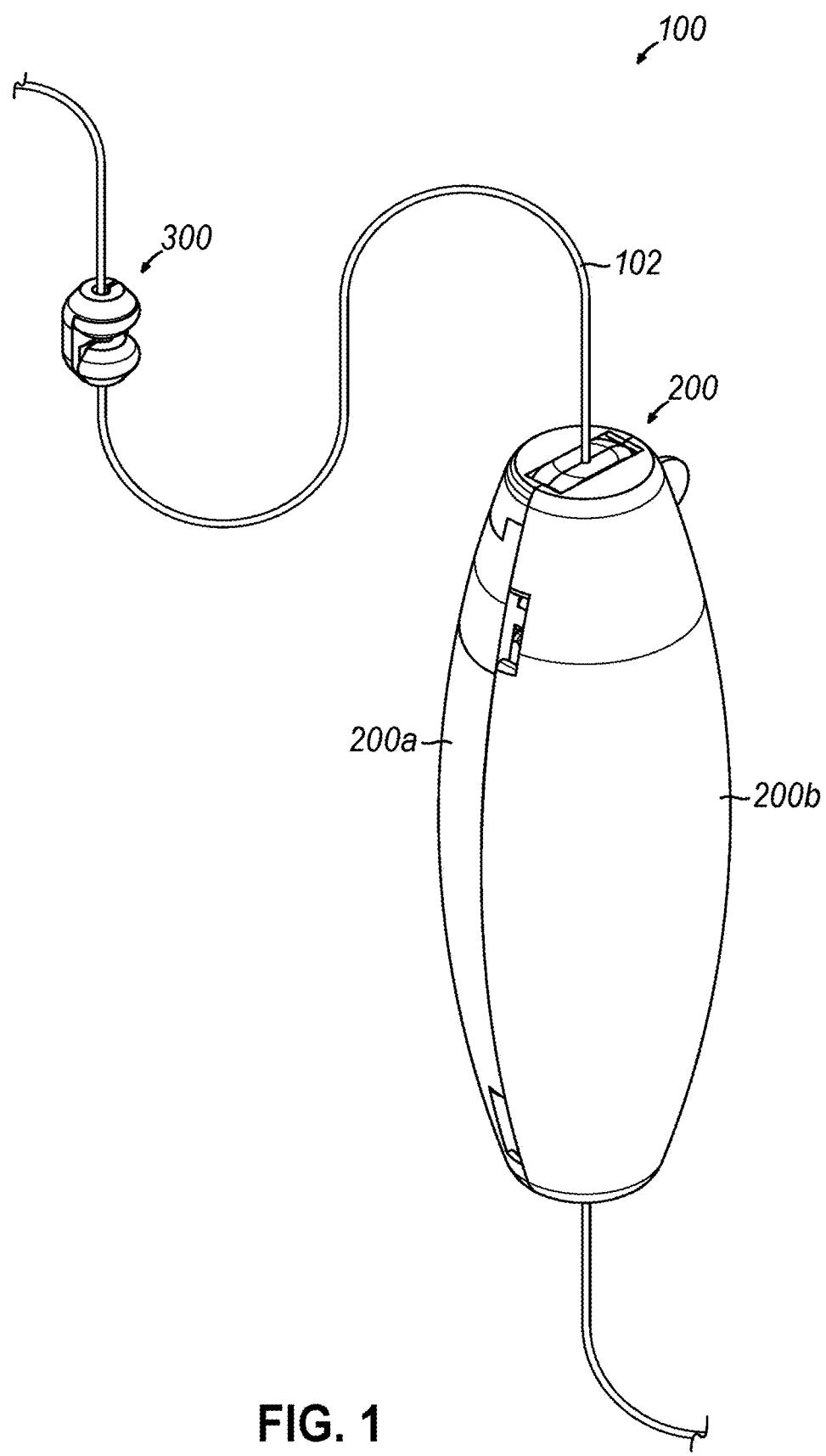
FIG. 1 depicts a perspective view of a segment of a terminal tackle system.
Figure 2:
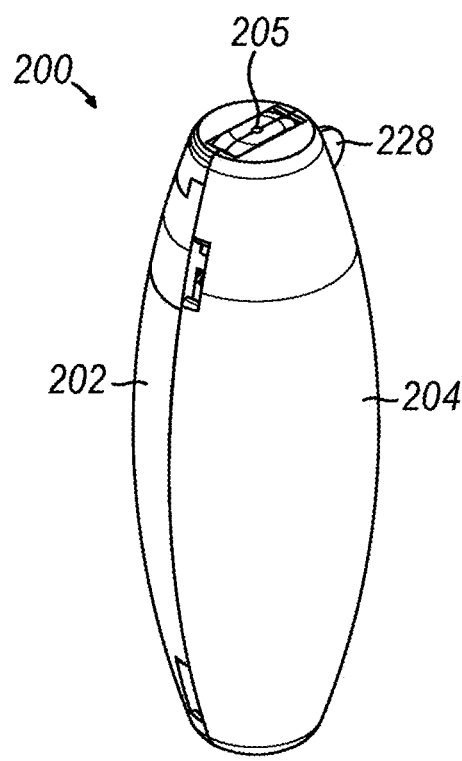
FIG. 2 depicts a perspective view of a split bobber.
Figure 3:
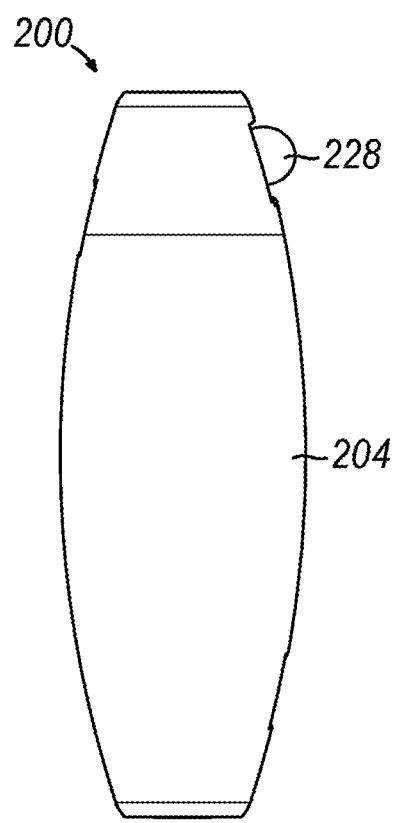
FIG. 3 depicts a front view of the split bobber of FIG. 2.
Figure 4:
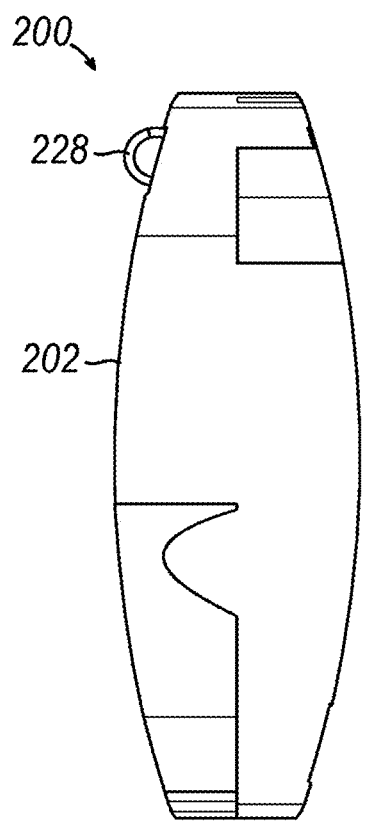
FIG. 4 depicts a rear view of the split bobber of FIG. 2.
Figure 5:
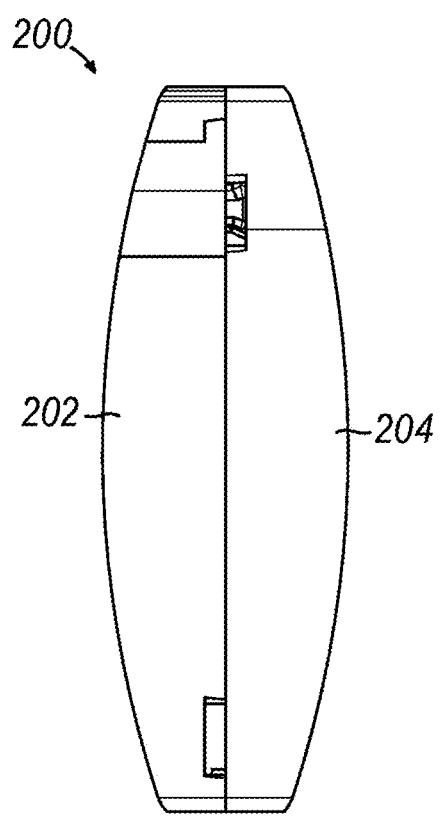
FIG. 5 depicts a left side view of the split bobber of FIG. 2.
Figure 6:
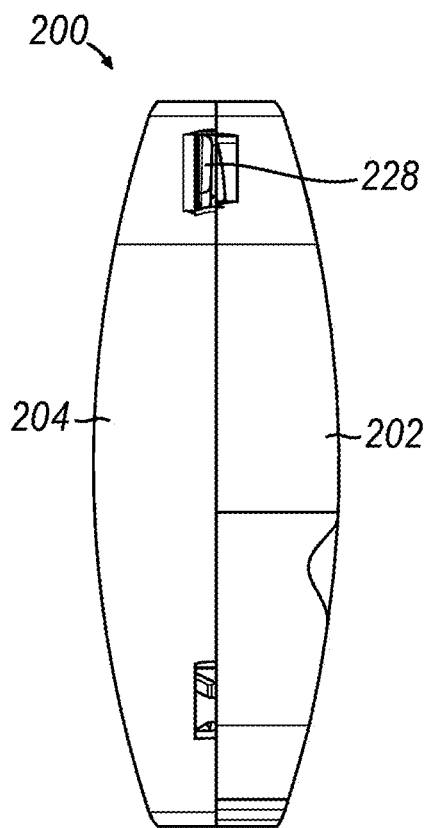
FIG. 6 depicts a right side view of the split bobber of FIG. 2.
Figure 7:
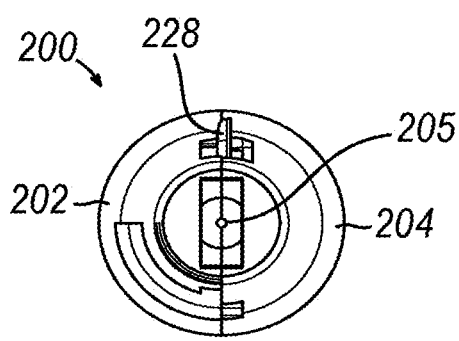
FIG. 7 depicts a top view of the split bobber of FIG. 2.
Figure 8:
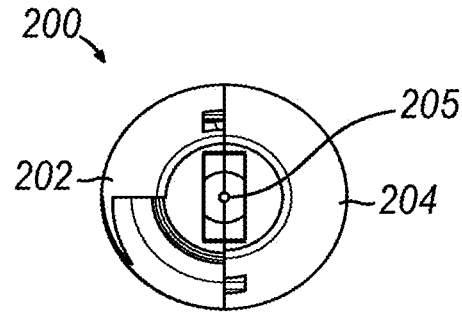
FIG. 8 depicts a bottom view of the split bobber of FIG. 2.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

To the extent that spatial terms such as "upper,", "lower," "vertical," "horizontal," or the like are used herein with reference to the drawings, it will be appreciated that such terms are used for exemplary description purposes only and are not intended to be limiting or absolute. In that regard, it will be understood that devices such as those disclosed herein may be used in a variety of orientations and positions not limited to those shown and described herein.

I. EXAMPLE OF A TERMINAL TACK SYSTEM

FIG. 1 illustrates an exemplary terminal tackle system 100 comprising a split bobber 200 and a snap-on bead 300 on a fishing line 102. It will be appreciated that terminal tackle system 100 may include other tackle components known in the industry, including but not limited to a bobber stop. As shown, the snap-on bead is positioned above the split bobber 200. In other words, the split bobber 200 is positioned between the snap-on bead and the hook (not shown) at the end of the fishing line 102. Both the split bobber 200 and the snap-on bead 300 may be removed and reattached to the fishing line 102 despite the fishing line 102 being already tied off to the fishing hook. In other words, the split bobber 200 and the snap-on bead 300 can be removed and reattached to the fishing line 102 without breaking the fishing line 102 or having to remove the hook from the fishing line 102.

II. EXAMPLE OF A SPLIT BOBBER

The split bobber 200 of the terminal tackle system 100 is shown in FIGS. 2-8 in an assembled state. In this state, the split bobber 200 resembles commonplace bobbers and floats—as used herein, the terms bobber and float are used interchangeably. In the present example, the split bobber 200 is shaped like a cigar-shaped float. However, other float shapes such as pole, cone (popping), oval, pear, and round may be used. Additional components of the split bobber 200, such as the slip insert 210 and grip insert 220, may generally approximate a cross sectional shape of the split bobber 200 (e.g., cigar, pole, cone (popping), oval, pear, and round).

In the illustrated embodiment, the split bobber 200 includes a slip housing 202, a grip housing 204, a slip insert 210, and a grip insert 220. Other embodiments may combine the slip housing 202 with the slip insert 210, and likewise the grip housing 204 with the grip insert 220, into a singular component that may maintain the features of the separate housings and inserts as described below. This includes being able to open the split bobber 200 into its disassembled state to separate the slip portion 200a (i.e., slip housing 202 and slip insert 210) from the grip portion 200b (i.e., grip housing 204 and grip insert 220) and expose the internal structure of split bobber 200. Being able to separate split bobber 200 into the slip portion 200a and grip portion 200b allows a user to attach or re-attach split bobber 200 to fishing line 102 and remove split bobber 200 from fishing line 102 without having to cut or break fishing line 102.

Slip housing 202 and grip housing 204 may be made of any suitable material that allows the split bobber 200 to float. In some embodiments, slip housing 202 and grip housing 204 may be made of foam material such as closed cell extruded polystyrene foam (XPS) or expanded polystyrene foam (EPS), or any other material, or combination of materials, that is buoyant. In other embodiments, slip housing 202 and grip housing 204 may be made of plastic and constructed to create an air pocket that allows the split bobber 200 to float. Constructing slip housing 202 and grip housing 204 out of foam may reduce the manufacturing cost and increase the ease of manufacturability compared to other constructions. The slip insert 210 and grip insert 220 may be made from a polymer or plastic material such as acrylonitrile butadiene styrene (ABS), or any other semi-rigid material.

In the assembled state, a line pass-through cavity 205 is created through the joining of the slip channel 214 and grip channel 224, both of which are discussed below. The line pass-through cavity 205 may traverse the split bobber 200 longitudinally, terminating on the top (FIG. 7) and bottom (FIG. 8) of the split bobber 200. Additionally, the line pass-through cavity 205 may be axially sized to ensure fishing line is able to slide freely within it.

While in the assembled state, the snap-fit tab 228 of the grip insert 220 (discussed below) may be partially or fully exposed along a portion of the perimeter of the split bobber 200. With this configuration, a user may engage the snap-fit tab 228 to begin the transition of the split bobber 200 into its disassembled state.

Figure 9:
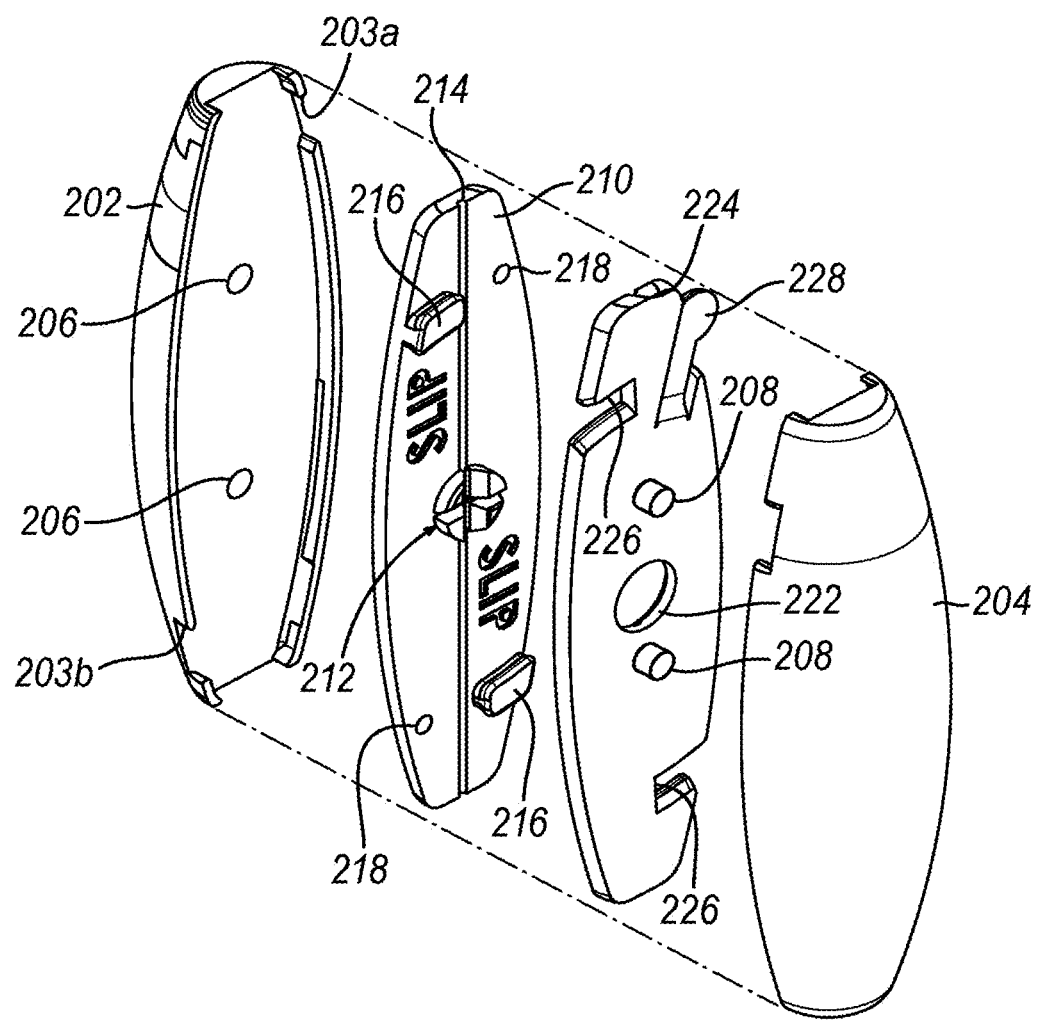
FIG. 9 depicts a first exploded assembly view of the split bobber of FIG. 2.
Figure 10:
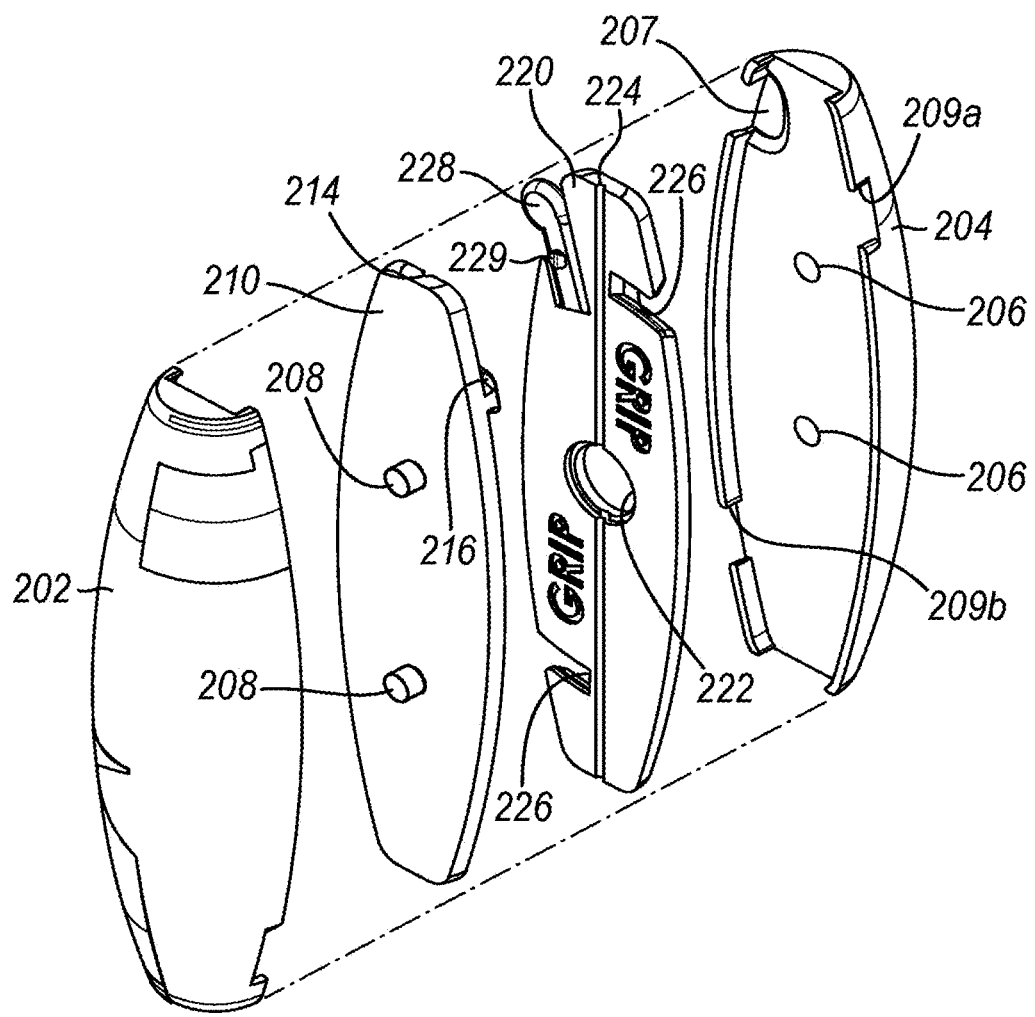
FIG. 10 depicts a second exploded assembly view of the split bobber of FIG. 2.

The exploded assembly views in FIGS. 9 and 10 depict the arrangement of slip housing 202, grip housing 204, slip insert 210, and grip insert 220. The slip housing 202 and grip housing 204 may each contain one or more housing holes 206, which may be blind holes. Similarly, the slip insert 210 and grip insert 220 may each contain one or more housing pegs 208.

In the current embodiment, the one or more housing holes 206 of the slip housing 202 align with the one or more housing pegs 208 of the slip insert 210 so that they can engage each other. Likewise, the one or more housing holes 206 of the grip housing 204 align with the one or more housing pegs 208 of the grip insert 220 so that they can engage each other. Engagement may be pressure-fitted so that the slip insert 210 and grip insert 220 may remain attached to the slip housing 202 and grip housing 204 respectively, but may also be forcibly separated. Embodiments may also provide for a stronger engagement between the corresponding housing and insert, such as through the use of an adhesive on the housing peg(s) and/or in the housing blind hole(s).

As shown, the grip housing 204 includes a tab recess 207. The tab recess 207 is positioned on the grip housing 204 to align with the snap-fit tab 228 of the grip insert 220. The tab recess 207 allows for the snap-fit tab 228 to disengage with the snap fit recess 218 (described below) while the split bobber 200 is in its assembled state. Both the slip housing 202 and the grip housing 204 may include additional recesses or cut outs in order to accommodate features of the slip insert 210 and grip insert 220 such as the tongue 216 described with the slip insert 210 below. For example, as shown in FIG. 9, slip housing 202 includes an upper tab cutout 203a and a lower tab cutout 203b that are configured to facilitate user access to snap-fit tab 228 so the user can release snap-fit tab 228 and separate slip portion 200a from grip portion 200b by rotating one portion in a clockwise direction relative to the other portion. As shown, one of upper tab cutout 203a and lower tab cutout 203b is aligned with tab recess 207 when slip portion 200a is assembled together with grip portion 200b. In addition, as shown in FIG. 10, grip housing 204 includes an upper tongue cutout 209a and a lower tongue cutout 209b that are configured to allow each tongue 216 to be received within a respective groove 226 when split bobber 200 is assembled and to allow each tongue 216 to be removed from a respective groove 226 when slip portion 200a and grip portion 200b are separated by rotating one portion in a clockwise direction relative to the other portion. As shown, upper tongue cutout 209a aligns with and is in communication with an upper groove 216 and lower tongue cutout 209b aligns with and is in communication with a lower groove 216 when grip insert 220 and group housing 204 are assembled together. In the illustrated embodiment, slip portion 200a and grip portion 200b are both configured to allow a user to assemble them together with slip portion 200a being in either vertical orientation. This capability is provided at least in part by having: (1) upper tab cutout 203a on one side and end of slip housing 202 and lower tab cutout 203b on the opposite side and opposite end of slip housing 202; (2) an upper tongue 216 on one side and end of slip insert 210 and a lower tongue 216 on the opposite side and opposite end of slip insert 210; (3) an upper snap fit recess 218 on one side and end of slip insert 210 and a lower snap fit recess 218 on the opposite side and opposite end of slip insert 210; and (4) an upper groove 226 on one side and end of grip insert 220 and a lower groove 226 on the opposite side and opposite end of grip insert 220. In other words, having the members of the respective pair of these features arranged in diagonally opposed locations on the respective insert or housing means that the user does not have to arrange slip portion 200a in a specific vertical orientation in order to engage grip portion 200*b* and assemble split bobber 200.

Figure 11A:
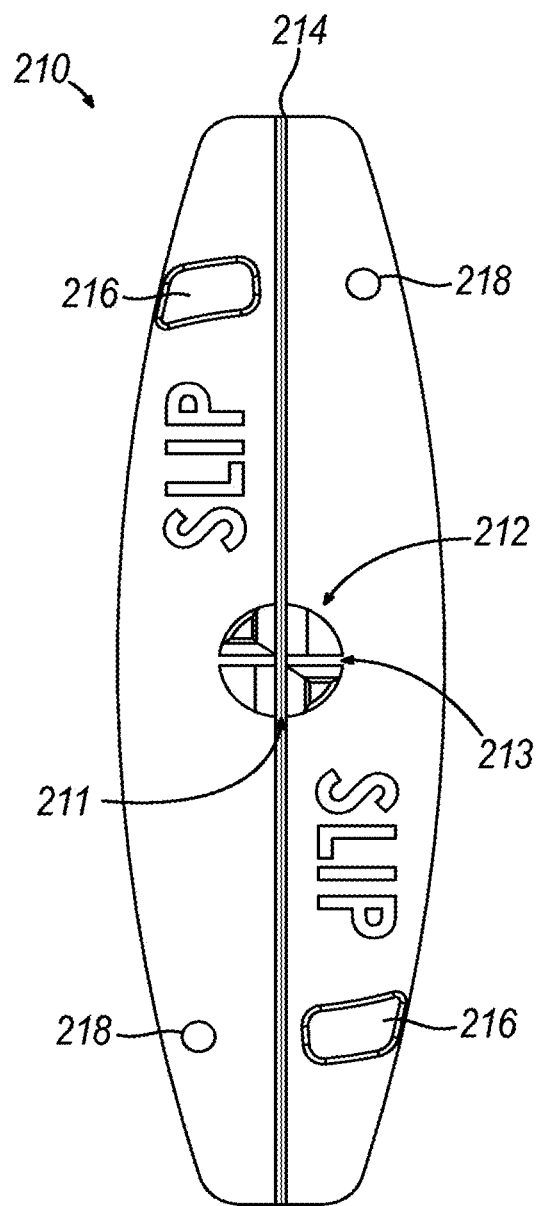
FIG. 11A depicts a front view of the slip insert of the split bobber of FIG. 2.
Figure 11B:
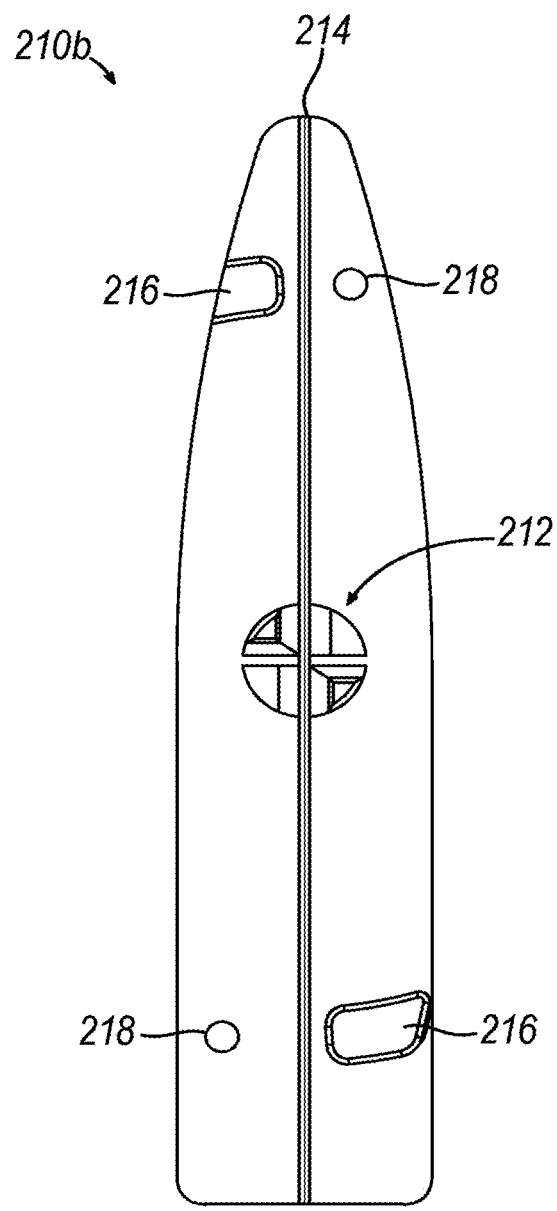
FIGS. 11B-F depict front views of slip inserts for different versions of the split bobber of FIG. 2.
Figure 11C:
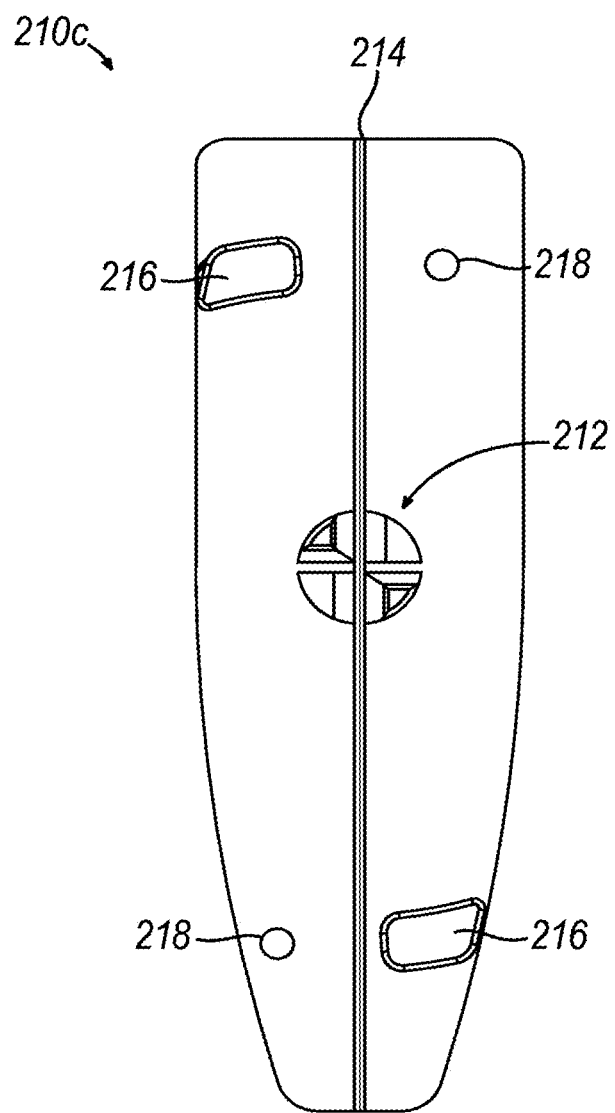
Figure 11D:
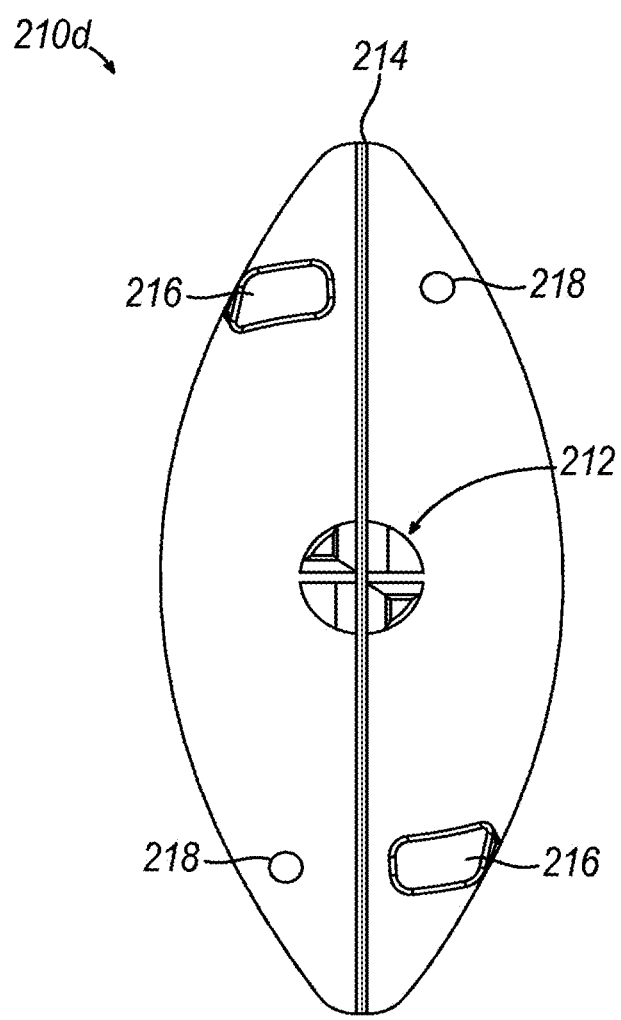
Figure 11E:
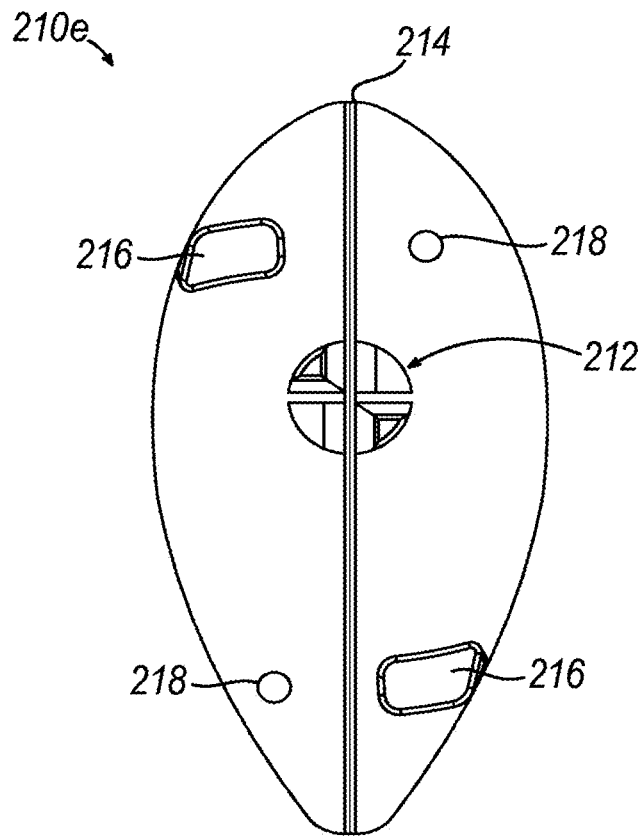

FIG. 11A illustrates a front view of the slip insert 210 of the split bobber 200. The slip insert 210 may be of singular construction, such as molded out of a polymer material. As shown, slip insert 210 comprises an insert peg 212, slip channel 214, a plurality of tongues 216 and two snap-fit recesses 218. The slip channel 214 longitudinally traverses the slip insert 210 and may be axially sized to accommodate the diameter of the fishing line 102. In other words, slip channel 214 is configured to allow fishing line to be able to move freely along the slip channel 214 such that slip insert 210 can slide along the length of the fishing line 102 when split bobber 200 is assembled in the slip configuration. As shown, slip channel 214 is located along the central longitudinal axis of slip insert 210 such that slip channel 214 longitudinally bisects slip insert 210. The snap-fit recesses 218 are positioned to align with the protrusion 229 of the snap-fit tab 228 of the grip insert 220 so that counter-rotating movement between the slip insert 210 and the grip insert 220 is prevented when the protrusion 229 is received within one of the snap-fit recesses 218.

The insert peg 212 may be generally cylindrical in shape, or it may resemble another shape that corresponds with the shape of the insert aperture 222 in order for the two components to engage. Engagement of the insert peg 212 with the insert aperture 222 may help limit the effect of shear forces on the assembled split bobber 200. In addition, in the illustrated embodiment, the insert peg 212 is divided into four quadrants such that the vertical quadrant channel 211 and horizontal quadrant channel 213 that create the sections have a width that is equal to or greater than the width of the slip channel 214. The insert peg 212 is positioned along the slip channel 214 so that a portion of the slip channel 214 is one of the perpendicular channels—vertical quadrant channel 211—that create the quadrants. The other perpendicular channel-horizontal quadrant channel 213, is also shown on FIG. 11A. As shown, horizontal quadrant channel 213 is perpendicular to vertical quadrant channel 211 and slip channel 214. As shown, insert peg 212 is located at both the longitudinal center and lateral center of slip insert 210. In the illustrated embodiment, the edge of each quadrant that is adjacent to vertical quadrant channel 211 is beveled, while the edge adjacent to horizontal quadrant channel 213 of each quadrant of a pair of diagonally opposing quadrants is substantially square or not beveled while each edge adjacent to horizontal quadrant channel 213 of the other set of diagonally opposing quadrants is beveled. For example, as shown in FIG. 11A, the edges adjacent horizontal quadrant channel 213 of the upper right and lower left quadrants of the insert peg 212 are squared, while the edges adjacent horizontal quadrant channel 213 of the upper left and lower right quadrants are beveled. A different perspective of the insert peg 212 showing the non-beveled and beveled aspect can be seen on FIG. 9. This configuration of non-beveled and beveled edges of diagonally opposed quadrants facilitate the existence of both the slip and grip functionality in the split bobber 200. Specifically, the square edges along horizontal quadrant channel 213 keep the fishing line from sliding out of horizontal quadrant channel 213 while the split bobber 200 is in the grip configuration, and having all four edges along vertical quadrant channel 211 beveled allows the fishing line 102 to slide easily within vertical quadrant channel 211 and slip channel 214 when the split bobber 200 is in the slip configuration.

Tongues 216 on the slip insert 210 are configured to engage with the grooves 226 on the grip insert 224 in a tongue and groove fashion. Each of the tongues 216 has a shape that is complimentary to the shape of a corresponding one of the grooves 226. Stated differently, the tongues 216 and grooves 226 are complimentarily shaped such that tongues 216 are received within grooves 226 when bobber 200 is assembled. In the illustrated embodiment, tongues 216 and grooves 216 are curved, although other complimentary shapes may be used in other embodiments. As a result, each of the plurality of tongues 216 engages with a corresponding groove 226 from the plurality of grooves 226 in a manner that maintains engagement despite trying to separate the slip insert 210 from the grip insert 220 by applying shearing forces. In the illustrated embodiment, each of the plurality of tongues 216 slidably engages with a corresponding groove 226 from the plurality of grooves 226 as either the slip insert 210 or the grip insert 220 is rotated in a clockwise direction after inserting the insert peg 212 of the slip insert 210 into the insert aperture 222 of the grip insert 220. In alternative embodiments, one or more magnets (not shown), may be used in addition to or in place of the tongues 216 and grooves 226. In such an embodiment, at least one magnet could be affixed to or embedded within each of the slip insert 210 and grip insert 220. In such an embodiment, the magnets could be positioned similarly to tongues 216 and grooves 226 or in any other suitable location(s).

Figure 11F:
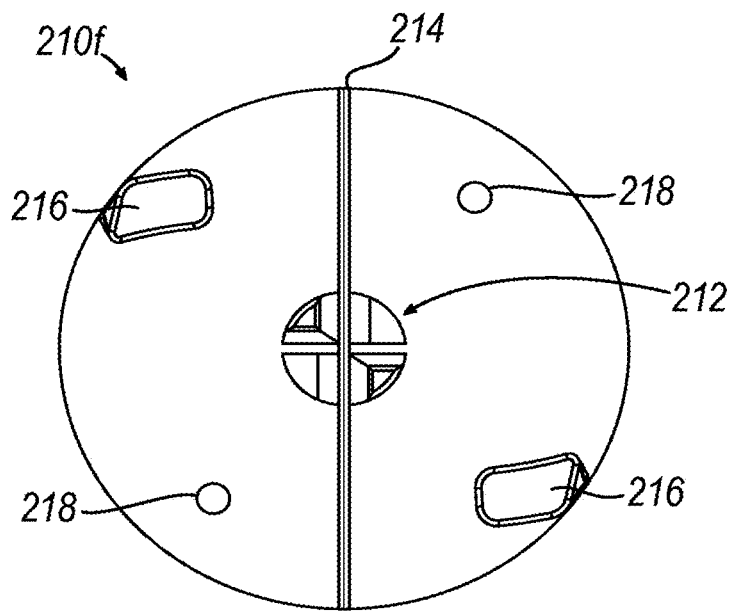

FIGS. 11B-F illustrate alternative embodiments of the slip insert 210, namely slip inserts 210*b-f*. These alternative embodiments would correspond with shapes of alternative embodiments of the split bobber 200. Different general shapes commonly used with fishing bobbers are shown, such as pole (FIG. 11B), popping (FIG. 11C), oval (FIG. 11D), pear (FIG. 11E), and round (FIG. 11F). The shape of the slip housing would correspond to the shape of the respective slip insert 210*b-f* in these alternative embodiments. The specific components of the slip insert and slip housing would be similar to those described above for slip insert 210 and slip housing 202.

Figure 12A:
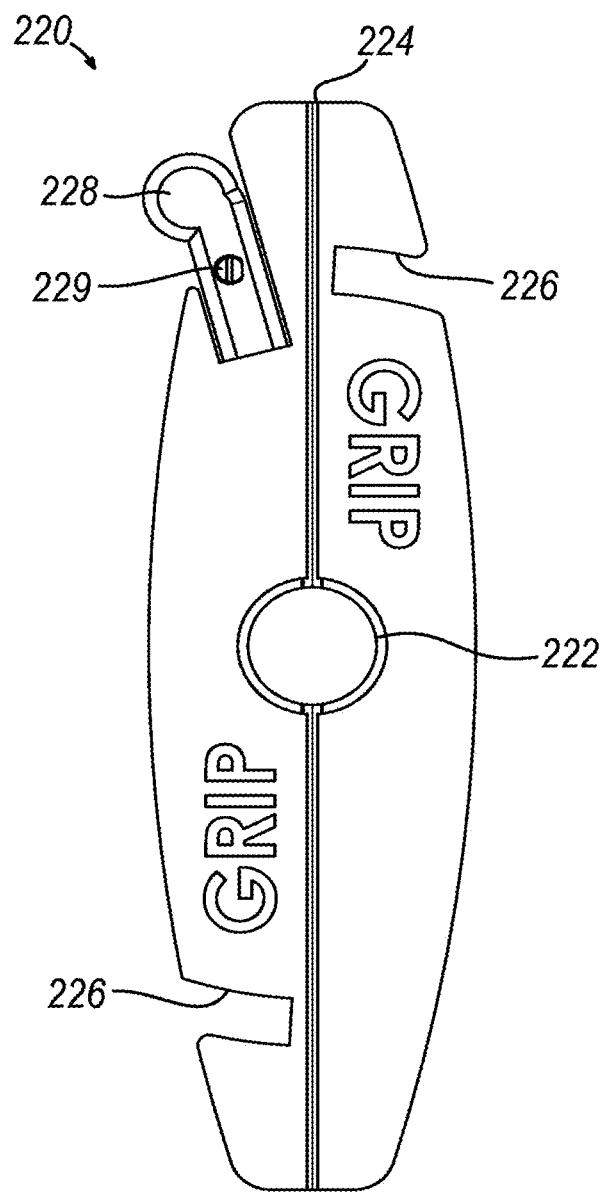
FIG. 12A depicts a front view of the grip insert of the split bobber of FIG. 2.
Figure 12B:
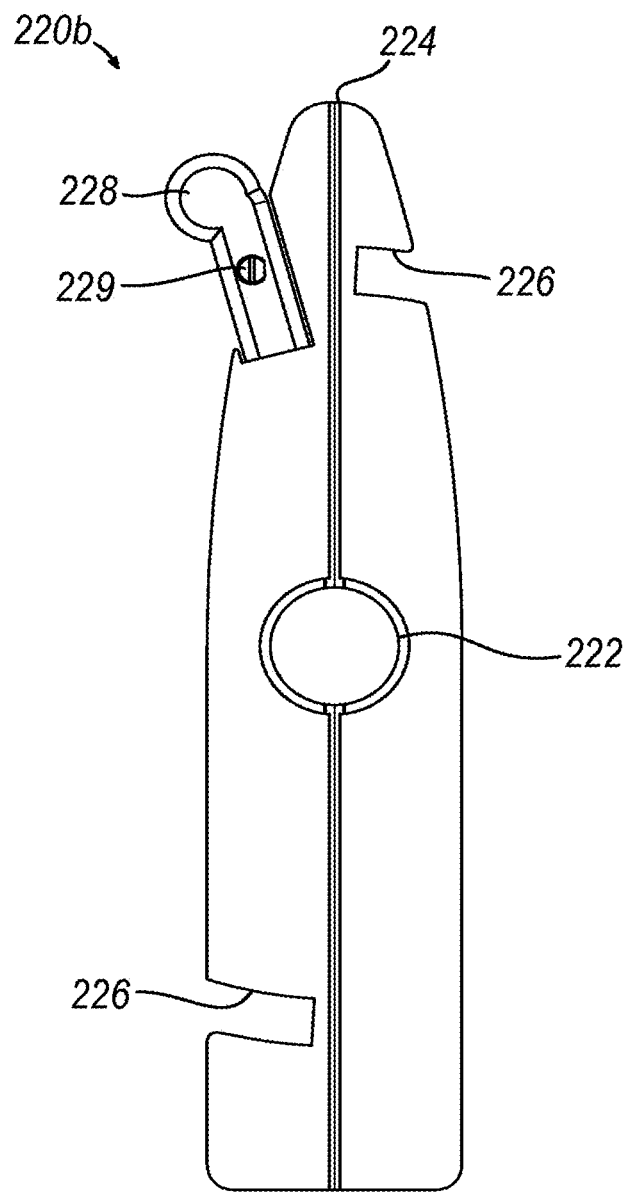
FIGS. 12B-F depict front views of grip inserts for different versions of the split bobber of FIG. 2.
Figure 12C:
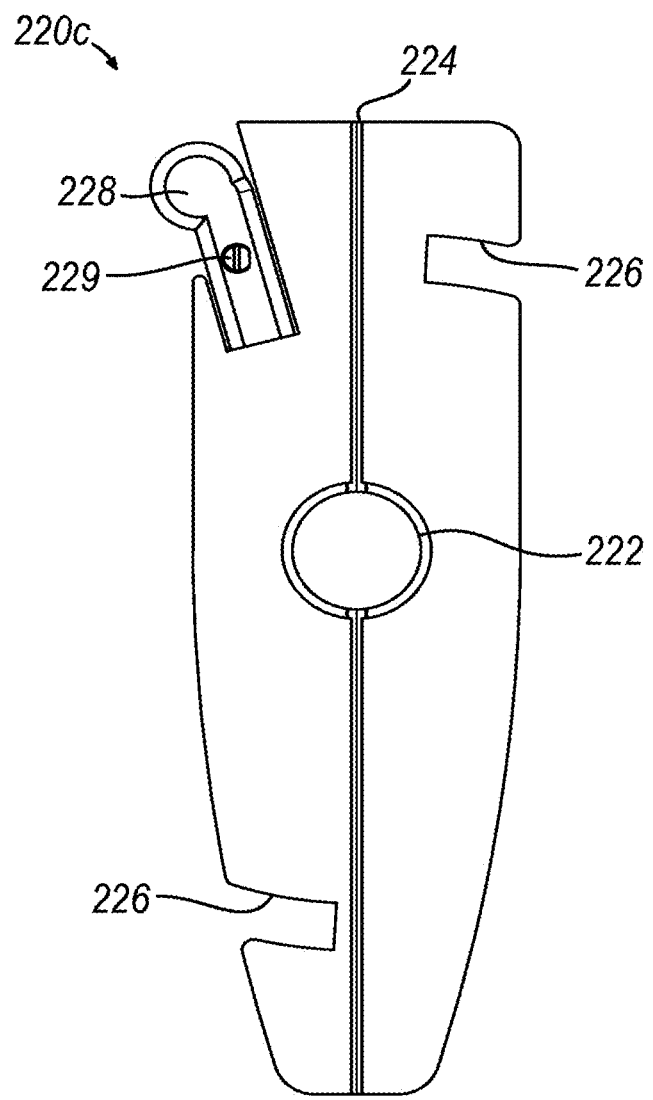
Figure 12D:
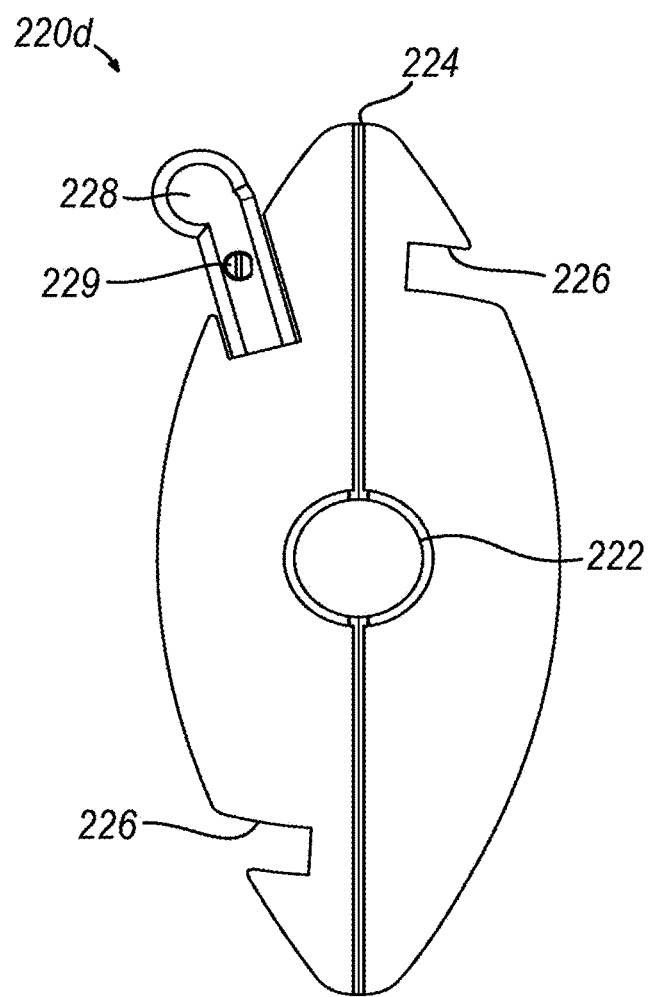
Figure 12E:
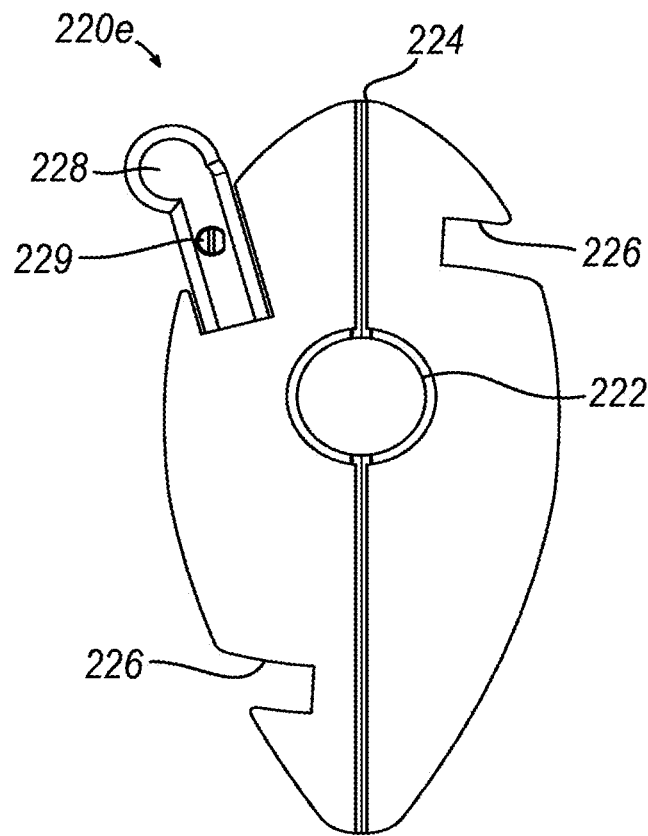

FIG. 12A illustrates a front view of the grip insert 220 of the split bobber 200. The grip insert 220 may be of singular construction, such as molded out of a polymer material. As shown, grip insert 220 comprises an insert aperture 222, grip channel 224, a plurality of grooves 226, and a snap-fit tab 228. Insert aperture 222 may be a through-hole as shown in the illustrated embodiment or any other shape or configuration capable of receiving insert peg 212. The grip channel 224 longitudinally traverses the grip insert 220 and may be axially sized to accommodate the diameter of the fishing line 102. In other words, grip channel 224 is configured to allow fishing line to be able to move freely along the grip channel 214 such that grip insert 220 can slide along the length of the fishing line 102 when split bobber 200 is assembled in the slip configuration. As shown, grip channel 224 is located along the central longitudinal axis of grip insert 220 such that grip channel 224 longitudinally bisects grip insert 220.

In the illustrated embodiment, the snap-fit tab 228 includes a protrusion 229, which is positioned on the snap-fit tab 228 to align with a snap-fit recess 218 of the slip insert 210 when the split bobber 200 is in its assembled configuration. In the assembled configuration, the protrusion 229 engages with the snap-fit recess 218 to prevent counter-rotating movement between the slip insert 210 and the grip insert 220. The snap-fit tab 228 may extend outwards from the grip insert 220, past the general perimeter of the grip insert 220. This results in a portion of the snap-fit tab 228 extending beyond the perimeter of the split bobber 200 when the split bobber 200 is in its assembled configuration. The extended portion provides a contact surface for a user to manipulate the snap-fit tab 228 in order to begin the disassembly of the split bobber 200. While the snap-fit tab 228 may be a part of the grip insert 220, as shown it is capable of being manipulated independently from the rest grip insert 220. In other words, snap-fit tab 228 is configured to flex relative to the remainder of grip insert 220. As shown, the shape of snap-fit tab 228, tab recess 207 and a respective one of upper tab cutout 203a and lower tab cutout 203b in slip housing 202 combine to provide enough space to allow for a sufficient degree of manipulation of the snap-fit tab 228 independent of the grip insert 200. The manipulation of the snap-fit tab 228 disengages the protrusion 229 from the snap-fit recess 218.

The insert aperture 222 may have a generally circular cross-section, or it may resemble another shape so long as it is complimentary to the shape of the insert peg 212 in order for the two components to engage. The insert aperture 222 is positioned along the grip channel 224 in a similar position as the insert peg 212 so that when slip portion 200a and grip portion 200b engage and the split bobber 200 is in its assembled configuration, the grip channel 224 combines with the slip channel 214 to create the line pass-through cavity 205. As shown, insert aperture 222 is located at both the longitudinal center and lateral center of grip insert 220.

Grooves 226 on the grip insert 220 are configured to engage with the tongues 216 on the slip insert 210 in a tongue and groove fashion. Each of the grooves 226 has a shape that is complimentary to the shape of a corresponding one of the tongues 216. Stated differently, the tongues 216 and grooves 226 are complimentarily shaped such that tongues 216 are received within grooves 226 when bobber 200 is assembled. In the illustrated embodiment, tongues 216 and grooves 226 are curved, although other complimentary shapes may be used in other embodiments. As a result, each of the grooves 226 engages with a corresponding tongue 216 from the plurality of tongues 216 in a manner that maintains engagement despite trying to separate the grip insert 220 from the slip insert 210 by applying shearing forces. In the illustrated embodiment, each of the plurality of grooves 226 slidably engages with a corresponding tongue 216 from the plurality of tongues 216 as either the grip insert 220 and the slip insert 210 is rotated in a clockwise direction after inserting the insert peg 212 of the slip insert 210 into the insert aperture 222 of the grip insert 220.

Figure 12F:
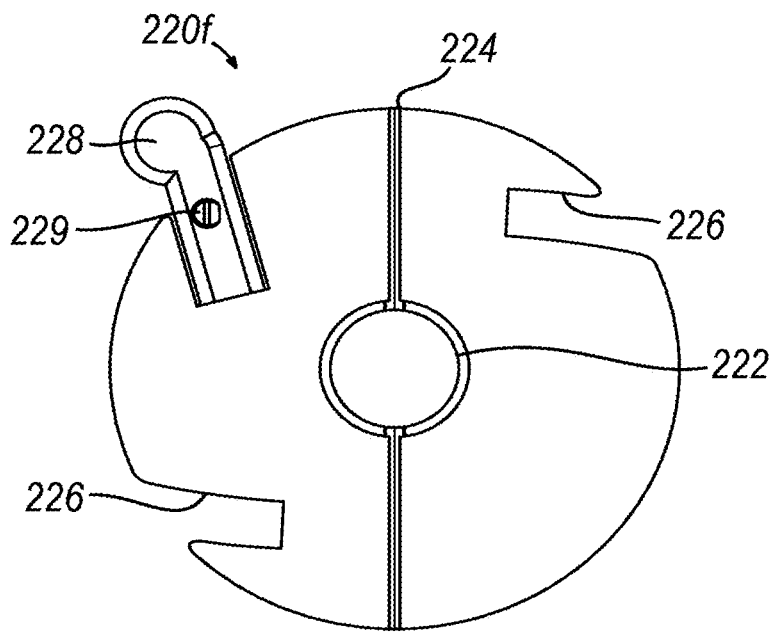
Figure 13:
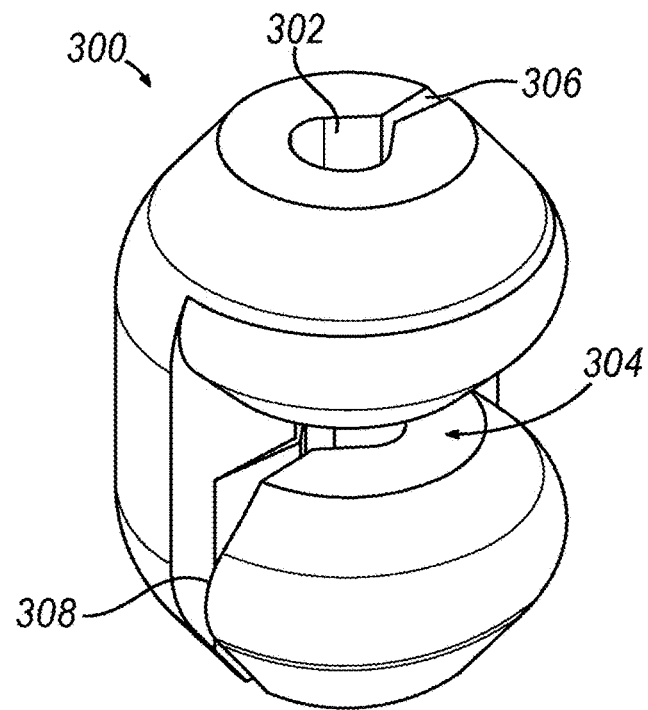
FIG. 13 depicts a perspective view of a snap-on bead.

FIGS. 12B-F illustrate alternative embodiments of the grip insert 220, namely grip inserts 220b-f. These alternative embodiments would correspond with shapes of alternative embodiments of the split bobber 200. Different general shapes commonly used with fishing bobbers are shown, such as pole (FIG. 12B), popping (FIG. 12C), oval (FIG. 12D), pear (FIG. 12E), and round (FIG. 12F). The shape of the grip housing would correspond to the shape of the respective grip insert in these alternative embodiments. The specific components of the grip insert and grip housing would be similar to those described above for grip insert 220 and grip housing 204.

III. EXAMPLE OF METHOD OF ASSEMBLY AND DISASSEMBLY OF SPLIT BOBBER

The operation of the assembly and disassembly of the split bobber 200 will now be discussed. As previously mentioned, the slip insert 210 engages with the slip housing 202 to form slip portion 200a and the grip insert 220 engages with the grip housing 204 to form grip portion 200b.

Figure 11G:
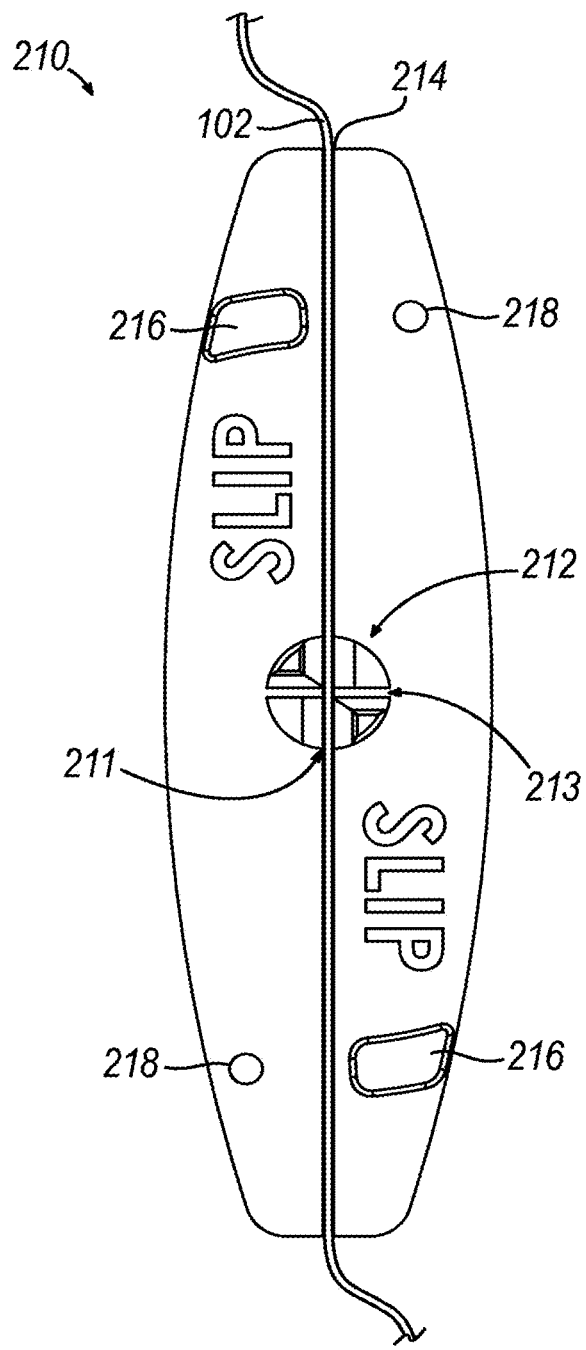
FIG. 11G depicts a front view of the slip insert of FIG. 11A engaged with the fishing line when the split bobber is in a slip configuration.

To assemble the split bobber 200 as a slip float or in a slip configuration (i.e., so that the split bobber 200 can move freely along fishing line 102 even after it has been assembled), position fishing line along the slip channel 214 of the slip portion 200a. The fishing line should be positioned within the vertical quadrant channel 211 bisecting the insert peg 212. Next, engage the insert aperture 222 of the grip portion 200b with the insert peg 212 of the slip side, ensuring the fishing line remains in the slip channel 214. Before engaging the grip portion 200b to the slip portion 200a with the insert aperture 222, rotate the grip portion 200b so that the grip portion 200b is offset at an angle (i.e., not parallel) to the slip portion 200a. For example, the grip portion 200b may be arranged substantially horizontally and the slip portion 200a may be arranged substantially vertically or at any other non-parallel angle. This offset allows for each of the plurality of tongues 216 to line up with a respective groove from the plurality of grooves 226. The grip portion 200b is then rotated counter-clockwise relative to the slip portion 200a to align the grip portion 200b with the slip portion 200a. When both sides are aligned, the protrusion 229 of the snap-fit tab 228 will engage with a snap-fit recess 218 thereby securing the slip portion 200a and grip portion 200b together. The line pass-through 205 will be formed and the split bobber 200 will be in its assembled state. The fishing line 102 will reside freely within the line pass-through 205, allowing the split bobber 200 to slide along the fishing line 102. FIG. 11G illustrates the position of the fishing line along slip channel 214 and vertical quadrant channel 211 when split bobber 200 is in a slip configuration.

Figure 11H:
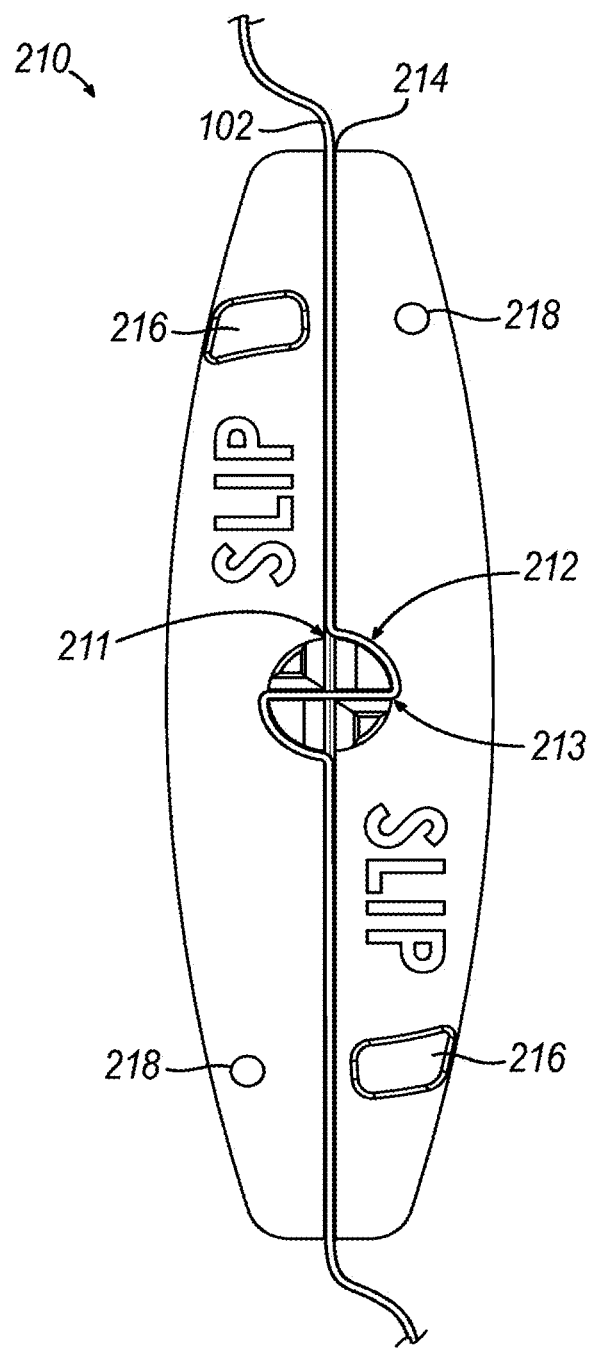
FIG. 11H depicts a front view of the slip insert of FIG. 11A engaged with the fishing line when the split bobber is in a grip configuration.

To assemble the split bobber 200 as a grip float or in a grip configuration (i.e., so that the split bobber 200 is fixed relative to the fishing line 102 and cannot move freely along the fishing line 102 after it has been assembled), position fishing line along the grip channel 224 of the grip portion 200b. The fishing line should bisect the insert aperture 222. Next, engage the insert peg 212 of the slip portion 200a with the insert aperture 222 of the grip portion 200b, ensuring the fishing line remains on the grip channel 224. Before engaging the slip portion 200a to the grip portion 200b with the insert peg 212, rotate the slip portion 200a so that the slip portion 200a and grip portion 200b are offset by 90 degrees. In this orientation, upon engaging the slip portion 200a to the grip portion 200b the fishing line will be positioned within horizontal quadrant channel 213 such that fishing line 102 bisects the insert peg 212. The slip portion 200a is then rotated in a counter-clockwise direction relative to the grip portion 200b to align the slip portion 200a with the grip portion 200b. During this rotation, the fishing line 102 remains disposed in the horizontal quadrant channel 213. When both sides are aligned, the protrusion 229 of the snap-fit tab 228 will engage with a snap-fit recess 218 thereby securing the grip portion 200b and slip portion 200a together. The line pass-through cavity 205 will be formed and the split bobber 200 will be in its assembled configuration. A portion of the fishing line 102 remains in the upper portion of line pass-through cavity 205 formed by slip channel 214 and grip channel 224, while a central portion of the fishing line 102 wraps around one of the quadrants of insert peg 212, traverses across slip channel 214 and grip channel 224 via horizontal quadrant channel 213, wraps back around another quadrant of insert peg 212 and then a lower portion of the fishing line 102 remains in the lower portion of line pass-through cavity 205 formed by slip channel 214 and grip channel 224. In this configuration, because the fishing line was partially wrapped around one of the diagonally opposing quadrants of the insert peg 212 and the insert peg 212 is now engaged with the insert aperture 222, the fishing line 102 is held in place, preventing the split bobber 200 from sliding along the fishing line. The square or non-beveled edges of diagonally opposed quadrants of insert peg 212 along horizontal quadrant channel 213 help keep the fishing line 102 in place when the slip bobber 200 is in the grip configuration. FIG. 11H illustrates the position of the fishing line 102 along slip channel 214 and horizontal quadrant channel 213 when split bobber 200 is in a grip configuration. When the split bobber 200 is in the grip configuration, it may be used without a snap-on bead, a bobber stop, or other component configured to keep a slip bobber in place.

To disassemble the split bobber 200, manipulate the snap-fit tab 228 to disengage the protrusion 229 from the snap-fit recess 218. After disengaging the protrusion 229 from the snap-fit recess 218, rotating the slip portion 200a or the grip portion 200b in a clockwise direction relative to the other portion will then disengage each of the plurality of tongues 216 from a corresponding groove 226 and allow the slip portion 200a to be separated from the grip portion 200b.

IV. EXAMPLE OF A SNAP-ON BEAD

The snap-on bead 300 of the terminal tackle system 100 is shown in FIGS. 13-18. The snap-on bead 300 may be molded from a thermoplastic polymer such as polypropylene, or any other semi-rigid material. In the present example, the snap-on bead 300 is generally shaped like a traditional bead used in terminal tackle systems, with a longitudinal channel 302 that traverses the longitudinal axis of snap-on bead 300.

Figure 14:
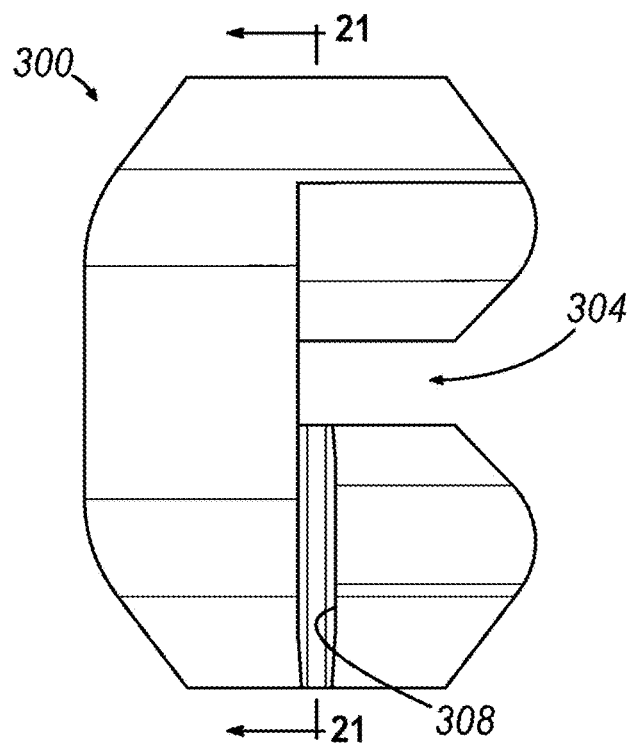
FIG. 14 depicts a front view of the snap-on bead of FIG. 13.
Figure 15:
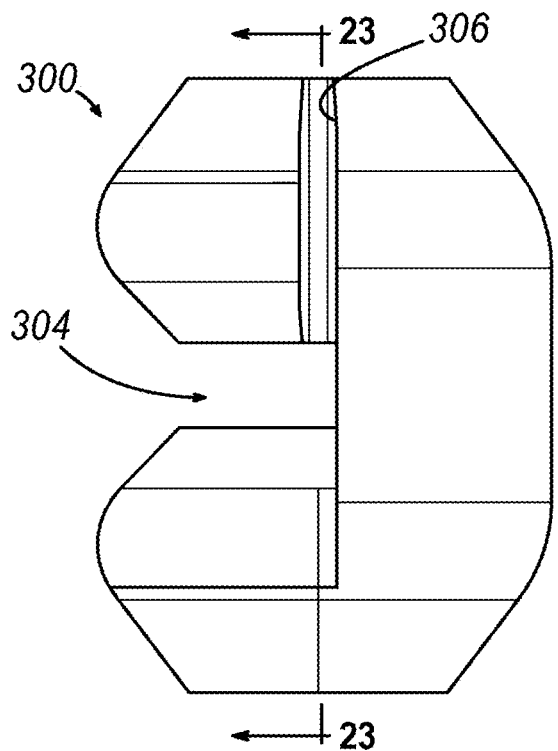
FIG. 15 depicts a rear view of the snap-on bead of FIG. 13.
Figure 16:
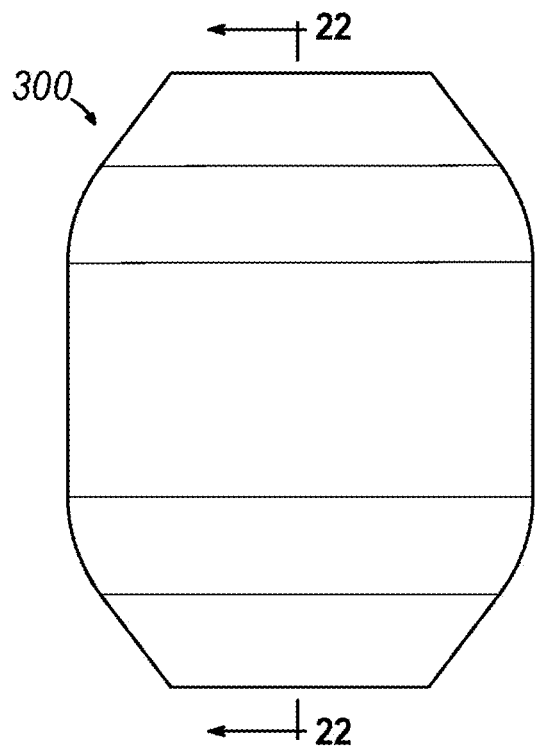
FIG. 16 depicts a left side view of the snap-on bead of FIG. 13.
Figure 17:
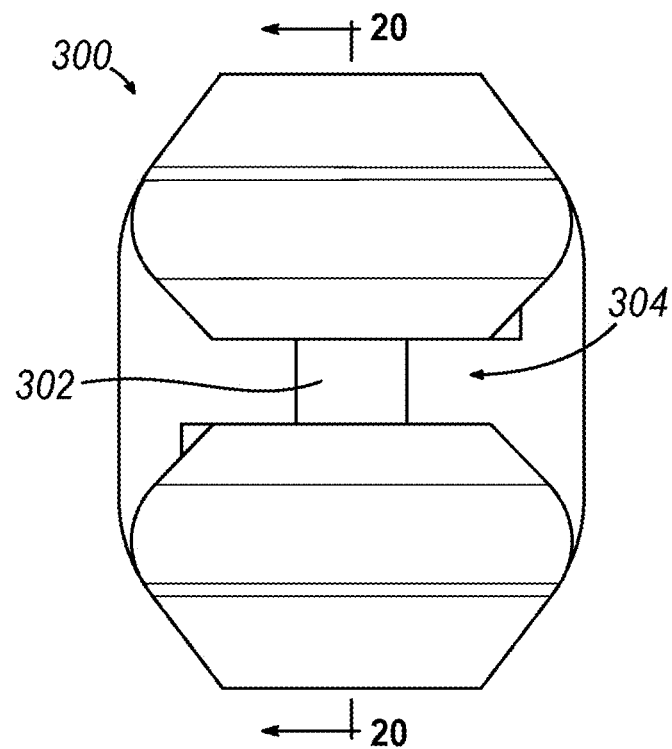
FIG. 17 depicts a right side view of the snap-on bead of FIG. 13.
Figure 18:
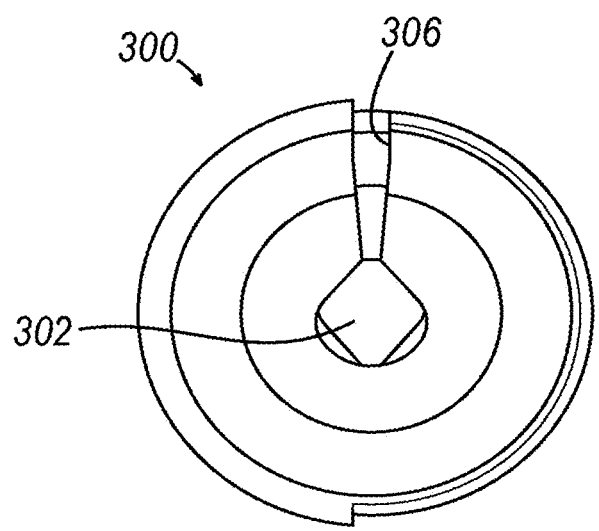
FIG. 18 depicts a top view of the snap-on bead of FIG. 13.

As shown, the snap-on bead 300 includes an insertion channel 304, an upper notch 306, and a lower notch 308. The insertion channel 304 is a cut-out of the snap-bead 300. As shown in FIGS. 14-15, the insertion channel 304 is vertically centered on the snap-on bead 300, and extends inwards toward the center of the snap-on bead 300. In the center of the snap-on bead 300, the insertion channel 304 is in communication with the longitudinal channel 302, with access to the upper portion (i.e., the portion of the longitudinal channel 302 above the insertion channel 304) and lower portion (i.e., the portion of the longitudinal channel 302 below the insertion channel 304) of the longitudinal channel 302. The insertion channel 304 may be sized to accommodate the diameter of the fishing line 102.

Figure 19:
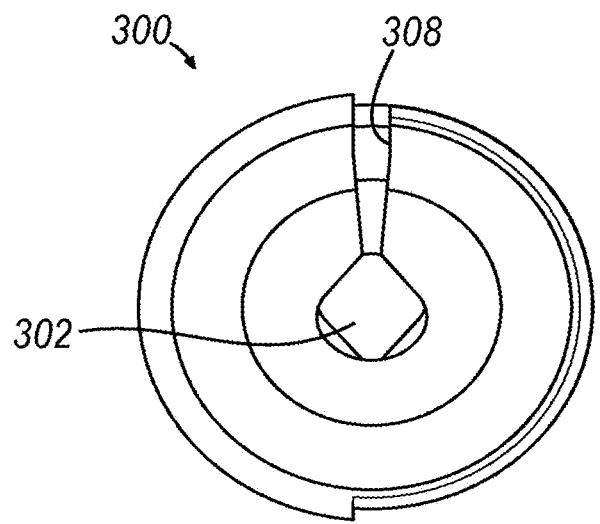
FIG. 19 depicts a bottom view of the snap-on bead of FIG. 13.
Figure 20:
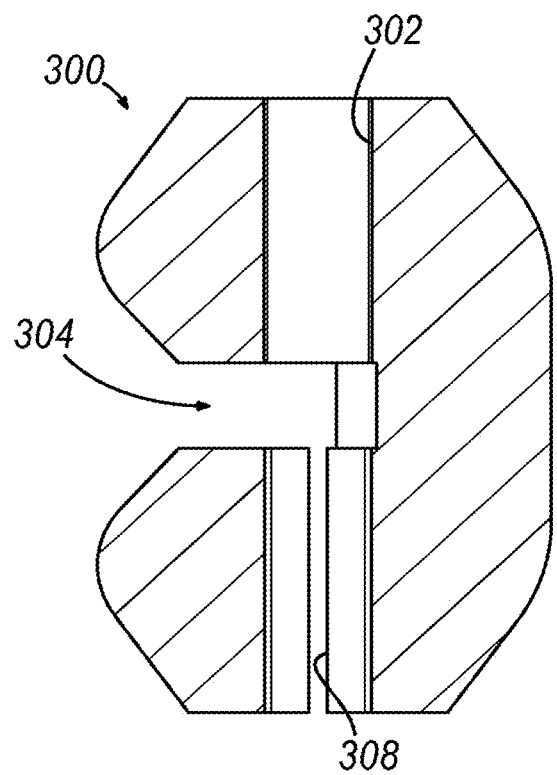
FIG. 20 depicts a cross-sectional view of the snap-on bead taken along line 20-20 of FIG. 17.
Figure 21:
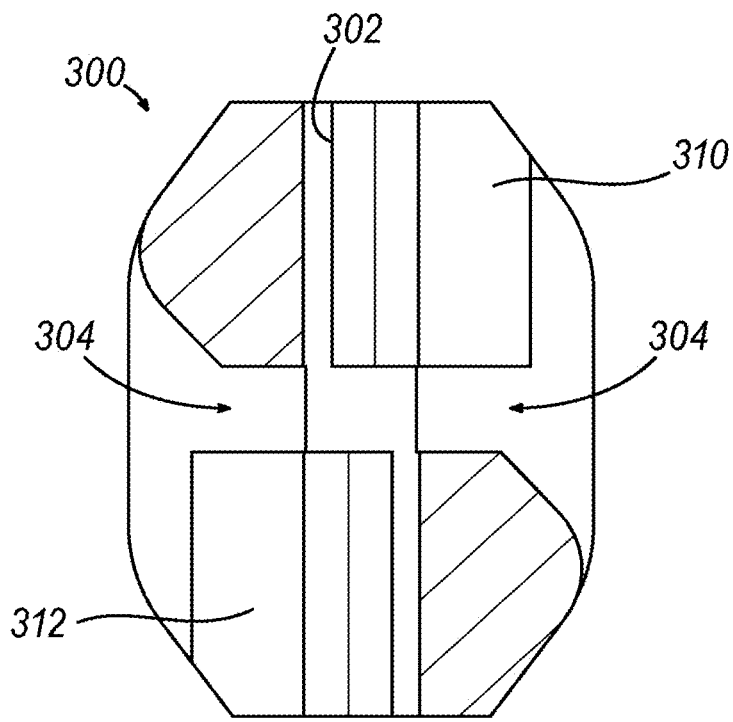
FIG. 21 depicts a cross-sectional view of the snap-on bead taken along line 21-21 of FIG. 14.
Figure 22:
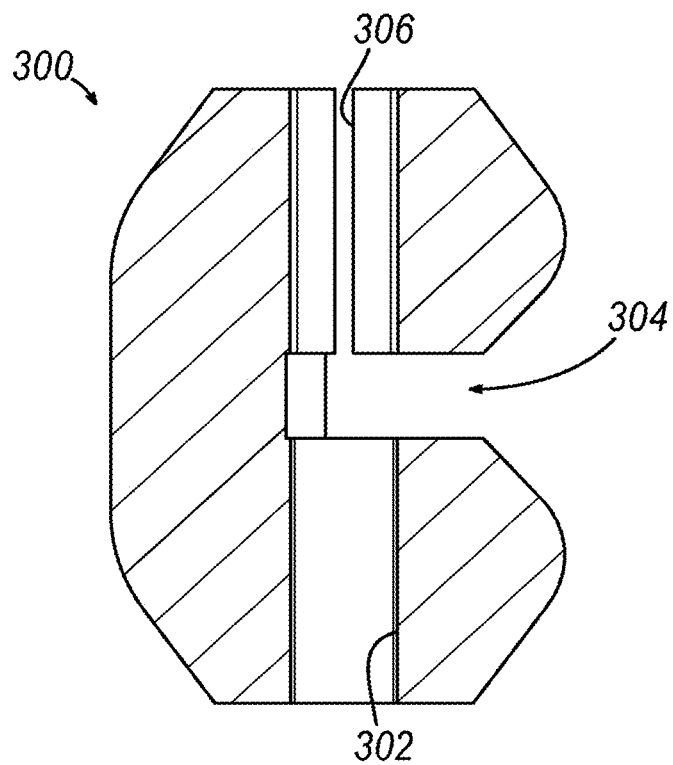
FIG. 22 depicts a cross-sectional view of the snap-on bead taken along line 22-22 of FIG. 16.
Figure 23:
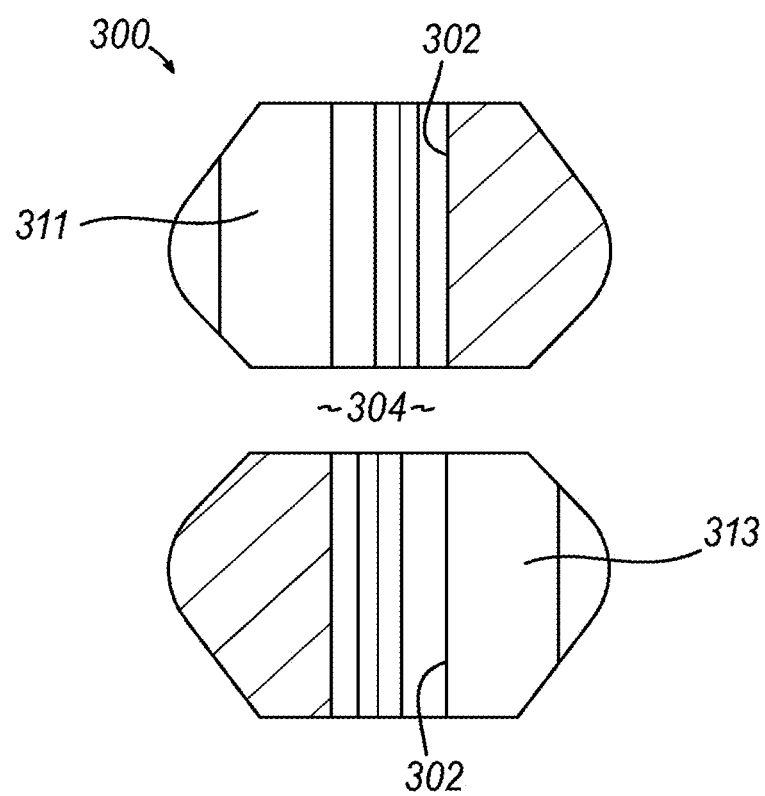
FIG. 23 depicts a cross-sectional view of the snap-on bead taken along line 23-23 of FIG. 15.

The upper notch 306 and the lower notch 308 allow for fishing line 102 to transition from the insertion channel 304 to the longitudinal channel 302. In the illustrated embodiment, both the upper notch 306 and lower notch 308 are wedge-shaped cavities having a wider end or mouth and a narrower end that is in communication with the longitudinal channel 302. The orientation of an embodiment of the upper notch 306 and lower notch 308 is visible in FIGS. 18-19 and described as follows. Each notch 306, 308 is oriented vertically on respective upper and lower portions of the snap-on bead 300, the insertion channel 304 serving as the dividing line between upper and lower portions. Each notch 306, 308 is defined by the surface of the snap-on bead 300, with the first upper notch wall 310 and second upper notch wall 311 stemming from the upper portion, and the first lower notch wall 312 and second lower notch wall 313 from the lower portion. For reference, all four notch walls can be seen in the cross-sectional drawings of FIGS. 20-23.

As shown, the upper notch 306 and lower notch 308 are widest at the perimeter of the snap-on bead 300, tapering as they approach the longitudinal channel 302. In one embodiment, the notch walls of each notch converge as they approach the longitudinal channel 302. Specifically, the first upper notch wall 310 converges with the second upper notch wall 311 and the first lower notch wall 312 converges with the second lower notch wall 313. This convergence does not fuse the first upper notch wall 310 with the second upper notch wall 311 or the first lower notch wall 312 with the second lower notch wall 313, but rather abuts them to each other. Abutment may mean direct contact, but may also signify a positioning where first upper notch wall 310 and second upper notch wall 311 or first lower notch wall 312 and second lower notch wall 313 are separated but still close enough between the respective upper and lower notch walls so as to function as if there were direct contact. Because the notch walls are abutting, when an external force is applied at either convergence area, the respective notch walls diverge. This divergence allows an object to pass into the longitudinal channel 302. In other words, the first upper notch wall 310 and second upper notch wall 311 terminate adjacent to longitudinal channel 302 such that the first upper notch wall 310 and second upper notch wall 311 are spaced apart a distance that is less than the diameter of fishing line 102. As a result, fishing line 102 can be pressed into longitudinal channel 302 and will remain within longitudinal channel 302 unless and until sufficient force is applied to fishing line 102 to cause fishing line 102 to squeeze through the opening between first upper notch wall 310 and second upper notch wall 311. Accordingly, the snap-on bead 300 will remain on the fishing line 102 during use. First lower notch wall 312 and second lower notch wall 313 may be similarly constructed and positioned relative to each other.

The upper notch 306 and lower notch 308 are positioned on the snap-on bead 300 to be diagonally opposed. For example, and as can be seen on FIG. 13, the upper notch 306 is on the upper right part of the upper portion of the snap-on bead 300 and the lower notch 308 is on the lower left part of the lower portion. Being diagonally opposed allows for an object—such as fishing line—to be inserted into the snap-on bead 300 with the rotational method described below. Other embodiments may position the notches differently, requiring a different insertion method.

V. EXAMPLE OF METHOD OF ATTACHING AND REMOVING SNAP-ON BEAD

Steps that can be used to attach the snap-on bead 300 to fishing line 102 are shown in FIGS. 24A-24C. To attach the snap-on bead 300 to fishing line 102, first orient the snap-on bead 300 so that the fishing line 102 is received within the insertion channel 304 (see FIG. 24A). Then, rotate the snap-on bead 300 relative to the fishing line 102 so that the fishing line 102 is received within both the upper notch 306 and the lower notch 308 (see FIG. 24B). As the fishing line approaches the narrow ends of upper notch 306 and lower notch 308, increase the force with which the snap-on bead 300 is being rotated with. The increased force will allow the fishing line to slip through the narrow ends of upper notch 306 and lower notch 308 and into the longitudinal channel 302. The first upper notch wall 310 and second upper notch wall 311 may flex such that they spread apart from each other during the insertion of the fishing line 302 into longitudinal channel 302. The first lower notch wall 312 and second lower notch wall 313 may similarly flex such that they spread apart from each other during the insertion of the fishing line 102 into longitudinal channel 302. The snap-on bead 300 will then be secured around the fishing line (see FIG. 24C).

To remove the snap-on bead 300 from fishing line 102, the steps described above and shown in FIGS. 24A-24C can be reversed. For example, first locate the upper notch 306 and the lower notch 308. Then, rotate the snap-on bead 300 relative to the fishing line 102 so that the fishing line approaches both the upper notch 306 and the lower notch 308. As the fishing line makes contact at both convergence areas from within the longitudinal channel 302, increase the force with which the snap-on bead 300 is being rotated with. The increased force will allow the fishing line to slip through the abutment of the first upper notch wall 310 with the second upper notch wall 311, and the first lower notch wall 312 with the second lower notch wall 313, entering the upper notch 306 and lower notch 308. Continue the rotation until the fishing line has left the notches and is in the insertion channel 304. The snap-on bead 300 is now free to be removed from the fishing line 102.

VI. EXEMPLARY COMBINATIONS

The following examples related to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

A bobber comprising: (a) a grip portion comprising: a grip housing, and a grip insert engageable with the grip housing, wherein the grip insert comprises a grip channel extending along a longitudinal axis of the grip insert, an insert aperture, a tab, and a first groove, and (b) a slip portion comprising: a slip housing, and a slip insert engageable with the slip housing, wherein the slip insert comprises a slip channel extending along a longitudinal axis of the slip insert, an insert peg, an upper snap fit recess, and a first tongue configured to be received within the first groove of the grip insert, the insert peg comprising a vertical quadrant channel and a horizontal quadrant channel that separate the insert peg into four quadrants, wherein, when the grip portion and the slip portion are assembled together the insert peg is received within the insert aperture, the first tongue is received within the first groove, and the tab releasably engages the upper snap fit recess.

Example 2

The bobber of Example 1, wherein the grip insert further comprises at least one housing peg, and the grip housing further comprises at least one housing hole configured to receive the at least one housing peg when the grip insert is engaged with the grip housing.

Example 3

The bobber of Example 1, wherein the slip insert further comprises at least one housing peg, and the slip housing further comprises at least one housing hole configured to receive the at least one housing peg when the slip insert is engaged with the slip housing.

Example 4

The bobber of Example 1, wherein the grip housing comprises a tab recess aligned with the tab when the grip insert is engaged with the grip housing.

Example 5

The bobber of Example 1, wherein the slip insert further comprises a lower snap fit recess, wherein the upper snap fit recess is located on a first side of the longitudinal axis of the slip insert and adjacent to a first end of the slip insert and the lower snap fit recess is located on a second side of the longitudinal axis of the slip insert and adjacent to a second end of the slip insert.

Example 6

The bobber of Example 1, wherein the slip insert further comprises a second tongue, and the grip insert further comprises a second groove, wherein when the grip portion and the slip portion are assembled together the second tongue is received within the second groove.

Example 7

The bobber of Example 1, wherein the grip housing further comprises an upper tongue cutout along an outer edge of the grip housing and a lower tongue cutout along the outer edge of the grip housing, wherein the upper tongue cutout is located on a first side of a longitudinal axis of the grip housing and adjacent to a first end of the grip housing, and the lower tongue cutout is located on a second side of the longitudinal axis of the grip housing and adjacent to a second end of the grip housing.

Example 8

The bobber of Example 1, wherein the slip housing further comprises an upper tab cutout along an outer edge of the slip housing and a lower tab cutout along the outer edge of the slip housing, wherein the upper tab cutout is located on a first side of a longitudinal axis of the slip housing and adjacent to a first end of the slip housing, and the lower tab cutout is located on a second side of the longitudinal axis of the slip housing and adjacent to a second end of the slip housing.

Example 9

The bobber of Example 8, wherein the slip insert further comprises a lower snap fit recess, wherein the upper snap fit recess is located adjacent to the upper tab cutout and the lower snap fit recess is located adjacent to the lower tab cutout.

Example 10

The bobber of Example 1, wherein at least two of the four quadrants of the insert peg are flat.

Example 11

The bobber of Example 10, wherein at least two of the four quadrants of the insert peg comprise a square edge adjacent the horizontal quadrant channel.

Example 12

The bobber of Example 1, wherein a first quadrant of the insert peg is flat and a second quadrant of the insert peg is flat and the first quadrant is diagonally opposed to the second quadrant.

Example 13

A method for attaching a bobber to a fishing line, the bobber comprising a first portion and a second portion, the method comprising: (a) positioning the fishing line on a receiving portion of the bobber, wherein the receiving portion is one of the first portion and the second portion, wherein the first portion and the second portion are configurable between an engaged state and a disengaged state, and wherein the fishing line is positioned on the receiving portion while the first portion and the second portion are in the disengaged state, (b) positioning a non-receiving portion of the bobber to be in contact with the receiving portion while maintaining the disengaged state, wherein the non-receiving portion is one of the first portion and the second portion, and wherein the non-receiving portion is not the receiving portion, and (c) rotating one of the receiving portion or the non-receiving portion to configure the first portion and the second portion to the engaged state.

Example 14

The method of Example 13, wherein the first portion comprises a first channel and the second portion comprises a second channel, wherein positioning the fishing line on the receiving portion of the bobber positions the fishing line on one of the first channel and the second channel, and wherein the first channel and the second channel form a cavity when the first portion and the second portion are in the engaged state.

Example 15

The method of Example 14, wherein the first portion further comprises a peg and the second portion further comprises an aperture, the peg positioned on the first portion to divide the first channel into two parts, the aperture positioned on the second portion to divide the second channel into two parts, and wherein the peg is configured to be received into the aperture.

Example 16

The method of Example 15, wherein the peg comprises a vertical channel and a horizontal channel that are perpendicular to each other and centered on the peg to divide the peg into a first section, a second section, a third section, and a fourth section, and wherein the vertical channel connects the two parts of the first channel.

Example 17

The method of Example 16, wherein each of the first section, the second section, the third section, and the fourth section has a border area that is adjacent to the horizontal channel, and wherein at least two of the border areas are: configured to secure the fishing line, and diagonally opposed to each other along the horizontal channel.

Example 18

The method of Example 17, wherein the bobber moves freely along the fishing line while in the engaged state.

Example 19

The method of Example 16, wherein the receiving portion is the second portion, wherein positioning the non-receiving portion of the bobber to be in contact with the receiving portion while maintaining the disengaged state positions the horizontal channel on the fishing line, and wherein the bobber is affixed to the fishing line while in the engaged state.

Example 20

A terminal tackle system comprising: (a) a bobber comprising: (i) a grip portion comprising: a grip housing, and a grip insert engageable with the grip housing, wherein the grip insert comprises a grip channel extending along a longitudinal axis of the grip insert, an insert aperture, a tab, and a first groove, and (ii) a slip portion comprising: a slip housing, and a slip insert engageable with the slip housing, wherein the slip insert comprises a slip channel extending along a longitudinal axis of the slip insert, an insert peg, an upper snap fit recess, and a first tongue configured to be received within the first groove of the grip insert, the insert peg comprising a vertical quadrant channel and a horizontal quadrant channel that separate the insert peg into four quadrants, wherein, when the grip portion and the slip portion are assembled together the insert peg is received within the insert aperture, the first tongue is received within the first groove, and the tab releasably engages the upper snap fit recess, and (b) a bead comprising: (i) a longitudinal channel extending along a longitudinal axis of the bead, (ii) an upper notch, wherein the upper notch is wedge shaped comprising an outer end and an inner end, wherein the inner end of the upper notch is in communication with the longitudinal channel and the outer end of the upper notch is wider than the inner end of the upper notch, (iii) a lower notch, wherein the lower notch is wedge shaped comprising an outer end and an inner end, wherein the inner end of the lower notch is in communication with the longitudinal channel and the outer end of the lower notch is wider than the inner end of the lower notch, wherein the upper notch and the lower notch are positioned in diagonally opposite locations on the bead, and (iv) an insertion channel, wherein the insertion channel is positioned vertically between the upper notch and the lower notch.

Example 21

The bobber of Example 1, wherein the grip housing comprises a foam material.

Example 22

The bobber of Example 21, wherein the foam material is selected from the group of material consisting of closed cell extruded polystyrene (XPS) foam and expanded polystyrene foam (EPS).

Example 23

The bobber of Example 1, wherein the slip housing comprises a foam material.

Example 24

The bobber of Example 23, wherein the foam material is selected from the group consisting of closed cell extruded polystyrene (XPS) foam and expanded polystyrene foam (EPS).

Example 25

The bobber of Example 7, wherein the grip insert further comprises a second groove, wherein the first groove is in communication with the upper tongue cutout and the second groove is in communication with the lower tongue cutout.

Example 26

The bobber of Example 1, wherein the grip insert comprises acrylonitrile butadiene styrene (ABS).

Example 27

The bobber of Example 1, wherein the slip insert comprises acrylonitrile butadiene styrene (ABS).

Example 28

The bobber of Example 1, wherein the grip insert comprises a first material and the grip housing comprises a second material, wherein the first material and the second material are different.

Example 29

The bobber of Example 1, wherein the slip insert comprises a first material and the slip housing comprises a second material, wherein the first material and the second material are different.

Example 30

A bead comprising: (a) a longitudinal channel extending along a longitudinal axis of the bead, (b) an upper notch, wherein the upper notch is wedge shaped comprising an outer end and an inner end, wherein the inner end of the upper notch is in communication with the longitudinal channel and the outer end of the upper notch is wider than the inner end of the upper notch, (c) a lower notch, wherein the lower notch is wedge shaped comprising an outer end and an inner end, wherein the inner end of the lower notch is in communication with the longitudinal channel and the outer end of the lower notch is wider than the inner end of the lower notch, wherein the upper notch and the lower notch are positioned in diagonally opposite locations on the bead, and (d) an insertion channel, wherein the insertion channel is positioned vertically between the upper notch and the lower notch.

Example 31

The bead of Example 30, wherein the insertion channel is vertically centered along the longitudinal axis of the snap-on bead.

Example 32

The bead of Example 30, wherein the insertion channel is in communication with the upper notch.

Example 33

The bead of Example 30, wherein the insertion channel is in communication with the lower notch.

Example 34

The bead of Example 30, wherein the insertion channel is in communication with both the upper notch and the lower notch.

Example 35

The bead of Example 30, wherein the insertion channel comprises a longitudinal axis that is perpendicular to the longitudinal axis of the bead.

VII. MISCELLANEOUS

It should be understood that any one or more of the teachings, expressions, embodiments, examples, etc. described herein may be combined with any one or more of the other teachings, expressions, embodiments, examples, etc. that are described herein. The above-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of any claims that may be presented and is understood not to be limited to the details of structure and operation shown and described in the specification and drawings.

What is claimed:
1. A bobber comprising:
 (a) a grip portion comprising:
  a grip housing, and
  a grip insert engageable with the grip housing, wherein the grip insert comprises a grip channel extending along a longitudinal axis of the grip insert, an insert aperture, a tab, and a first groove; and (b) a slip portion comprising:
a slip housing, and
a slip insert engageable with the slip housing, wherein the slip insert comprises a slip channel extending along a longitudinal axis of the slip insert, an insert peg, an upper snap fit recess, and a first tongue configured to be received within the first groove of the grip insert, the insert peg comprising a vertical quadrant channel and a horizontal quadrant channel that separate the insert peg into four quadrants, wherein, when the grip portion and the slip portion are assembled together the insert peg is received within the insert aperture, the first tongue is received within the first groove, and the tab releasably engages the upper snap fit recess.

2. The bobber of claim 1, wherein the grip insert further comprises at least one housing peg, and the grip housing further comprises at least one housing hole configured to receive the at least one housing peg when the grip insert is engaged with the grip housing.

3. The bobber of claim 1, wherein the slip insert further comprises at least one housing peg, and the slip housing further comprises at least one housing hole configured to receive the at least one housing peg when the slip insert is engaged with the slip housing.

4. The bobber of claim 1, wherein the grip housing comprises a tab recess aligned with the tab when the grip insert is engaged with the grip housing.

5. The bobber of claim 1, wherein the slip insert further comprises a lower snap fit recess, wherein the upper snap fit recess is located on a first side of the longitudinal axis of the slip insert and adjacent to a first end of the slip insert and the lower snap fit recess is located on a second side of the longitudinal axis of the slip insert and adjacent to a second end of the slip insert.

6. The bobber of claim 1, wherein the slip insert further comprises a second tongue, and the grip insert further comprises a second groove, wherein when the grip portion and the slip portion are assembled together the second tongue is received within the second groove.

7. The bobber of claim 1, wherein the grip housing further comprises an upper tongue cutout along an outer edge of the grip housing and a lower tongue cutout along the outer edge of the grip housing, wherein the upper tongue cutout is located on a first side of a longitudinal axis of the grip housing and adjacent to a first end of the grip housing, and the lower tongue cutout is located on a second side of the longitudinal axis of the grip housing and adjacent to a second end of the grip housing.

8. The bobber of claim 1, wherein a first quadrant of the insert peg is flat and a second quadrant of the insert peg is flat and the first quadrant is diagonally opposed to the second quadrant.

9. The bobber of claim 1, wherein the slip housing further comprises an upper tab cutout along an outer edge of the slip housing and a lower tab cutout along the outer edge of the slip housing, wherein the upper tab cutout is located on a first side of a longitudinal axis of the slip housing and adjacent to a first end of the slip housing, and the lower tab cutout is located on a second side of the longitudinal axis of the slip housing and adjacent to a second end of the slip housing.

10. The bobber of claim 9, wherein the slip insert further comprises a lower snap fit recess, wherein the upper snap fit recess is located adjacent to the upper tab cutout and the lower snap fit recess is located adjacent to the lower tab cutout.

11. The bobber of claim 1, wherein at least two of the four quadrants of the insert peg are flat.

12. The bobber of claim 11, wherein at least two of the four quadrants of the insert peg comprise a square edge adjacent the horizontal quadrant channel.

13. A terminal tackle system comprising:
(a) a bobber comprising:
(i) a grip portion comprising:
a grip housing, and
a grip insert engageable with the grip housing, wherein the grip insert comprises a grip channel extending along a longitudinal axis of the grip insert, an insert aperture, a tab, and a first groove, and
(ii) a slip portion comprising:
a slip housing, and
a slip insert engageable with the slip housing, wherein the slip insert comprises a slip channel extending along a longitudinal axis of the slip insert, an insert peg, an upper snap fit recess, and a first tongue configured to be received within the first groove of the grip insert, the insert peg comprising a vertical quadrant channel and a horizontal quadrant channel that separate the insert peg into four quadrants,
wherein, when the grip portion and the slip portion are assembled together the insert peg is received within the insert aperture, the first tongue is received within the first groove, and the tab releasably engages the upper snap fit recess; and
(b) a bead comprising:
(i) a longitudinal channel extending along a longitudinal axis of the bead,
(ii) an upper notch, wherein the upper notch is wedge shaped comprising an outer end and an inner end, wherein the inner end of the upper notch is in communication with the longitudinal channel and the outer end of the upper notch is wider than the inner end of the upper notch,
(iii) a lower notch, wherein the lower notch is wedge shaped comprising an outer end and an inner end, wherein the inner end of the lower notch is in communication with the longitudinal channel and the outer end of the lower notch is wider than the inner end of the lower notch, wherein the upper notch and the lower notch are positioned in diagonally opposite locations on the bead, and
(iv) an insertion channel, wherein the insertion channel is positioned vertically between the upper notch and the lower notch.

* * * * *